(12) United States Patent
Shirazian et al.

(10) Patent No.: US 12,205,315 B2
(45) Date of Patent: Jan. 21, 2025

(54) SYSTEMS AND METHODS FOR DETERMINING A VOLUME OF RESECTED TISSUE DURING A SURGICAL PROCEDURE

(71) Applicant: Intuitive Surgical Operations, Inc., Sunnyvale, CA (US)

(72) Inventors: Pourya Shirazian, Menlo Park, CA (US); Mahdi Azizian, San Jose, CA (US); A. Jonathan McLeod, Sunnyvale, CA (US); Azad Shademan, Campbell, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 340 days.

(21) Appl. No.: 17/781,272

(22) PCT Filed: Dec. 14, 2020

(86) PCT No.: PCT/US2020/064882
§ 371 (c)(1),
(2) Date: May 31, 2022

(87) PCT Pub. No.: WO2021/126776
PCT Pub. Date: Jun. 24, 2021

(65) Prior Publication Data
US 2022/0414914 A1   Dec. 29, 2022

Related U.S. Application Data

(60) Provisional application No. 62/948,500, filed on Dec. 16, 2019.

(51) Int. Cl.
*G06T 7/62* (2017.01)
*G06T 7/593* (2017.01)
*G06T 15/06* (2011.01)

(52) U.S. Cl.
CPC ............... *G06T 7/62* (2017.01); *G06T 7/593* (2017.01); *G06T 15/06* (2013.01);
(Continued)

(58) Field of Classification Search
CPC ........... G06T 7/62; G06T 7/593; G06T 15/06; G06T 2207/10012; G06T 2207/10028; G06T 2207/30004; G06T 2210/21
See application file for complete search history.

(56) References Cited

U.S. PATENT DOCUMENTS

2005/0041843 A1* 2/2005 Sawyer ............... A61N 5/1049
382/128
2014/0369584 A1* 12/2014 Fan ...................... G06T 7/0012
382/131
(Continued)

FOREIGN PATENT DOCUMENTS

WO    WO-2017066378 A1    4/2017

OTHER PUBLICATIONS

Andert F., "Drawing Stereo Disparity Images into Occupancy Grids: Measurement Model and Fast Implementation," IEEE/RSJ International Conference on Intelligent Robots and Systems, Oct. 2009, pp. 5191-5197.
(Continued)

*Primary Examiner* — John J Lee

(57) ABSTRACT

An exemplary tissue volume detection system accesses, during a surgical procedure involving resecting a piece of tissue from a body, a plurality of depth datasets for the resected piece of tissue. Each of the plurality of depth datasets is captured as a different portion of a surface of the resected piece of tissue is presented to an imaging device by an instrument that holds the resected piece of tissue in a manner that sequentially presents the different portions of the surface to the imaging device. During the surgical
(Continued)

procedure and based on the depth datasets, the system generates a three-dimensional (3D) occupancy map that includes a set of voxels identified to be occupied by the resected piece of tissue. Based on the 3D occupancy map and still during the surgical procedure, the system determines an estimated volume of the resected piece of tissue. Corresponding systems and methods are also disclosed.

20 Claims, 16 Drawing Sheets

(52) U.S. Cl.
CPC ............... *G06T 2207/10012* (2013.01); *G06T 2207/10028* (2013.01); *G06T 2207/30004* (2013.01); *G06T 2210/21* (2013.01)

(56) References Cited

U.S. PATENT DOCUMENTS

2017/0105601 A1* 4/2017 Pheiffer .................. G06T 17/10
2022/0414914 A1* 12/2022 Shirazian ................ G06T 7/593

OTHER PUBLICATIONS

International Search Report and Written Opinion for Application No. PCT/US2020/064882, mailed Mar. 5, 2021, 12 pages.
Maier-Hein L., et al., "Optical Techniques for 3D Surface Reconstruction in Computer-Assisted Laparoscopic Surgery," Medical Image Analysis, May 3, 2013, vol. 17 (8), pp. 974-996.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2020/064882, mailed on Jun. 30, 2022, 9 pages.

* cited by examiner

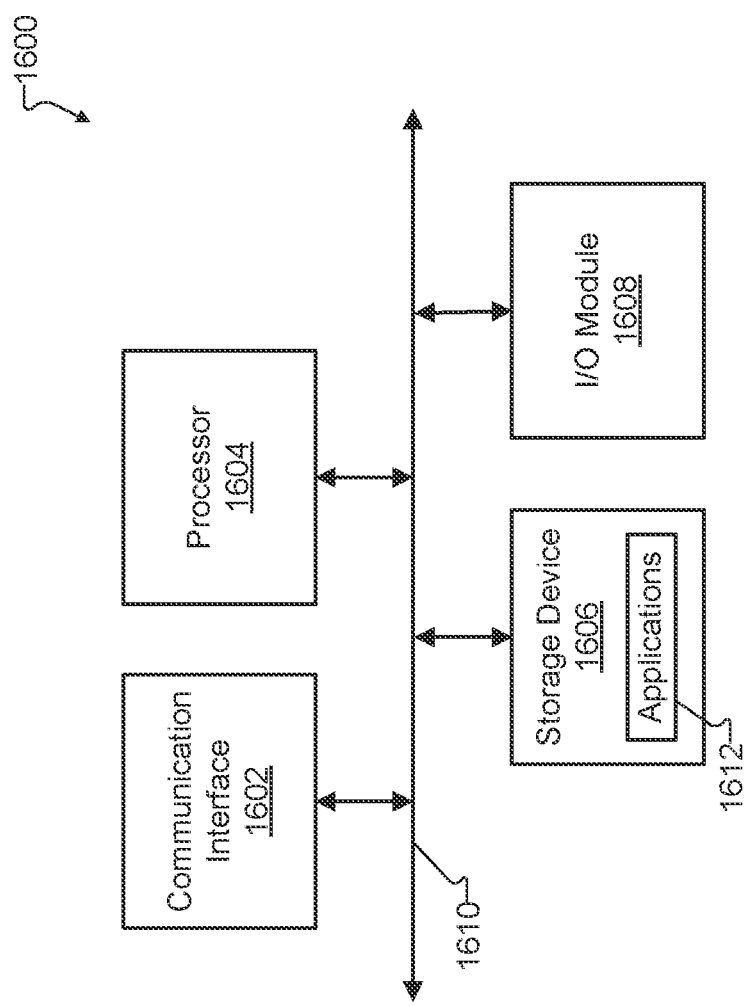

SYSTEMS AND METHODS FOR DETERMINING A VOLUME OF RESECTED TISSUE DURING A SURGICAL PROCEDURE

RELATED APPLICATIONS

The present application is a U.S. National Stage Application under 35 U.S.C. § 371 of International Application No. PCT/US2020/064882, filed on Dec. 14, 2020, which claims priority to U.S. Provisional Patent Application No. 62/948,500, filed on Dec. 16, 2019, the contents of which are hereby incorporated by reference in their entirety.

BACKGROUND INFORMATION

Various types of surgical procedures involve resecting a piece of tissue (e.g., excising, removing, or otherwise cutting out a mass, sample, or other portion of tissue) from a body being operated on (e.g., a body of a human patient, a cadaver, an animal, a training fixture, etc.). For example, the piece of resected tissue may incorporate an entire organ or other body part (e.g., an appendix during an appendectomy, etc.) or a portion of an organ or other body part (e.g., a portion of kidney tissue during a partial nephrectomy, etc.).

After a piece of tissue has been resected, it may be desirable for various reasons to determine a volume of the piece of resected tissue. For instance, it may be desirable to record the volume of tissue that has been removed within documentation associated with the surgery (e.g., documentation to be later referenced by members of the surgical team, the patient, insurance providers, etc.). As another example, it may be desirable to compare the measured volume of tissue that has been resected with an expected volume of tissue that was anticipated to be resected based on preoperative planning. In this way, the surgical team may ensure that the volume of tissue actually resected is at least as great as expected, thereby indicating, for example, that an entire mass was removed and will not present later risks or issues (e.g., metastasis of a cancerous growth, etc.).

SUMMARY

The following description presents a simplified summary of one or more aspects of the systems and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An exemplary system includes a memory storing instructions and a processor communicatively coupled to the memory and configured to execute the instructions. For example, during a surgical procedure that involves resecting a piece of tissue from a body, the processor may execute the instructions to access a plurality of depth datasets for the resected piece of tissue. Each depth dataset in this plurality of depth datasets may be captured as a different portion of a surface of the resected piece of tissue is presented to an imaging device by an instrument that holds the resected piece of tissue in a manner that sequentially presents the different portions of the surface to the imaging device. The processor may further execute the instructions to generate, during the surgical procedure and based on the plurality of depth datasets, a three-dimensional (3D) occupancy map including a set of voxels identified to be occupied by the resected piece of tissue. Moreover, the processor may execute the instructions to determine, during the surgical procedure and based on the 3D occupancy map, an estimated volume of the resected piece of tissue.

Another exemplary system also includes a memory storing instructions and a processor communicatively coupled to the memory and configured to execute the instructions. Again, in this example, the processor may execute the instructions to access, during a surgical procedure that involves resecting a piece of tissue from a body, a plurality of depth datasets for the resected piece of tissue, where each depth dataset in the plurality of depth datasets is captured as a different portion of a surface of the resected piece of tissue is presented to an imaging device by an instrument that holds the resected piece of tissue in a manner that sequentially presents the different portions of the surface to the imaging device. The processor may also execute the instructions to access an expected volume of the resected piece of tissue that is determined prior to the surgical procedure, and to generate, during the surgical procedure and based on the plurality of depth datasets, a 3D occupancy map including a set of voxels identified to be occupied by the resected piece of tissue. After executing the instructions to determine an estimated volume of the resected piece of tissue based on the 3D occupancy map, the processor may also compare the estimated volume of the resected piece of tissue with the expected volume of the resected piece of tissue, and indicate, to a member of a surgical team performing the surgical procedure, whether the estimated volume is within a predetermined threshold of the expected volume. All of these operations may be performed by the processor during the surgical procedure such that the member of the surgical team may be intraoperatively apprised of whether the estimated volume is within the predetermined threshold of what is expected.

An exemplary method is performed by a tissue volume detection system during a surgical procedure that involves resecting a piece of tissue from a body. The method includes accessing a plurality of depth datasets for the resected piece of tissue, where each depth dataset in the plurality of depth datasets is captured as a different portion of a surface of the resected piece of tissue is presented to an imaging device by an instrument that holds the resected piece of tissue in a manner that sequentially presents the different portions of the surface to the imaging device. The method further includes generating, during the surgical procedure and based on the plurality of depth datasets, a 3D occupancy map including a set of voxels identified to be occupied by the resected piece of tissue. Moreover, the method includes determining an estimated volume of the resected piece of tissue during the surgical procedure and based on the 3D occupancy map.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 16 illustrates an exemplary computing device according to principles described herein.

DETAILED DESCRIPTION

Figure 1:
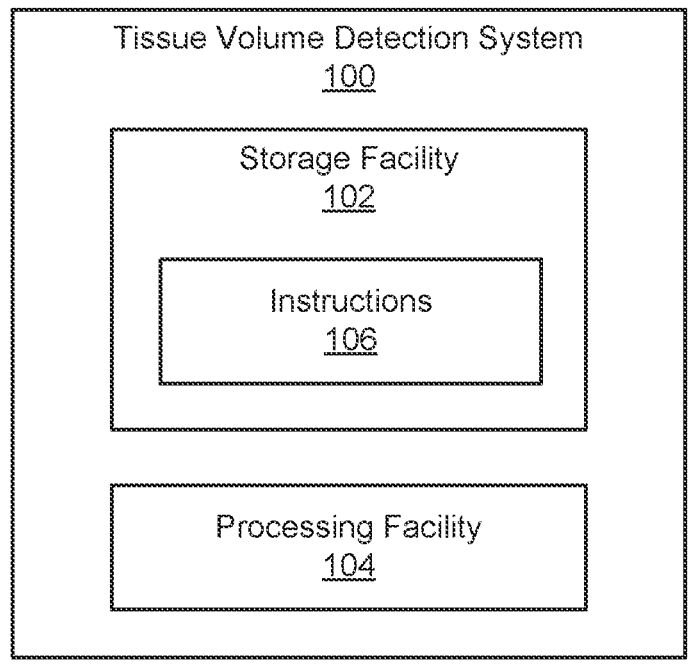
FIG. 1 illustrates an exemplary tissue volume detection system for determining a volume of resected tissue during a surgical procedure according to principles described herein.

Systems and methods for determining a volume of resected tissue during a surgical procedure are described herein. As described above, there may be various reasons for which it is desirable to measure the volume of a resected piece of tissue, including to record the volume in documentation summarizing the surgical procedure, to ensure that an entirety of a tumor or other unwanted growth has been removed in accordance with preoperative planning, and so forth. While there are various ways to accurately measure the volume of a resected piece of tissue once the surgical procedure is complete and the resected piece of tissue has been withdrawn from the body, it may be particularly useful and advantageous in certain scenarios for the volume of a resected piece of tissue to be determined immediately after the resection while the tissue is still within the body (i.e., while the surgical procedure is still ongoing and prior to the tissue being withdrawn from the body). To this end, methods and systems described herein relate to various ways of determining the volume of a piece resected tissue while the piece of resected tissue is still inside the body.

For example, an exemplary tissue volume detection system may access, during the surgical procedure involving resecting a piece of tissue from a body, a plurality of depth datasets for the resected piece of tissue. Each depth dataset in the plurality of depth datasets may be captured as a different portion of a surface of the resected piece of tissue is presented to an imaging device. For example, an instrument that holds the resected piece of tissue may present the different portions of the surface of the resected piece of tissue to the imaging device in a sequential manner such as by rotating the resected piece of tissue around in the field of view of the imaging device to allow the imaging device to view and capture the entirety of the surface.

Based on this plurality of depth datasets, and also during the surgical procedure (e.g., as the surgical procedure is ongoing and while the resected piece of tissue is still within the body), the tissue volume detection system may generate a three-dimensional (3D) occupancy map. For example, the 3D occupancy map may include a set of voxels that are identified to be occupied by the resected piece of tissue. Accordingly, the tissue volume detection system may then determine, based on the 3D occupancy map and still during the surgical procedure, an estimated volume of the resected piece of tissue.

While this example and other examples described in detail herein employ pluralities of depth datasets for the resected piece of tissue that are captured as various portions of the resected piece of tissue is presented to an imaging device, it will be understood that, in certain examples, assumptions may be made about certain portions of the surface of the resected piece of tissue that would allow an estimated volume to be determined based on only a single captured depth dataset. For example, an exemplary tissue volume detection system may access, during a surgical procedure that involves resecting a piece of tissue from a body, a single depth dataset captured as a particular portion of a surface of the resected piece of tissue is presented to the image device. Then, based on this depth dataset and based on one or more assumptions about how the presented portion of the surface may represent other non-presented portions of the surface that are not captured and analyzed (e.g., an assumption that the resected piece of tissue is symmetrical, etc.), the exemplary tissue volume detection system may generate a 3D occupancy map that includes a set of voxels identified to be occupied by the resected piece of tissue. Accordingly, the tissue volume detection system may determine, based on the 3D occupancy map and still during the surgical procedure, an estimated volume of the resected piece of tissue. It will be understood that this single-depth-dataset-based estimation may only be as accurate as the one or more assumptions that are employed regarding how the presented portion of the tissue represents other portions that are not presented, captured, and/or analyzed.

A tissue volume detection system such as described above may provide various advantages and benefits to facilitate the surgical procedure and assist a surgical team performing the procedure. For example, among other advantages and benefits, a tissue volume detection system performing the operations described above may enable the surgical team to immediately (i.e., while the surgical procedure is still ongoing) get confirmation that a volume of a mass of resected tissue is no smaller than expected based on preliminary plans, and to thereby avoid metastasis by ensuring that the entire mass has been properly resected. If the tissue volume detection system indicates, for instance, that the entirety of the expected mass has not been successfully resected, the surgical team may investigate and continue operating to potentially resect the remainder of the expected tissue during the same surgical procedure (e.g., while the body is still under anesthesia, while the instruments and imaging device are still within the body, etc.), rather than having to reintroduce the instruments and/or imaging equipment to the body after having removed them in an extended or subsequent surgical procedure.

As one particular example of a tissue volume detection system configured to provide some of these specific benefits, an exemplary tissue volume detection system may access (e.g., during a surgical procedure that involves resecting a piece of tissue from a body) a plurality of depth datasets for the resected piece of tissue, where each depth dataset in the plurality of depth datasets is captured as a different portion of a surface of the resected piece of tissue is presented to an imaging device by an instrument that holds the resected piece of tissue in a manner that sequentially presents the different portions of the surface to the imaging device. This tissue volume detection system may further access an expected volume of the resected piece of tissue. For example, the expected volume may be determined prior to the surgical procedure, such as based on preoperative scanning performed in preparation for the surgery.

As with the tissue volume detection system described above, this tissue volume detection system may generate, during the surgical procedure and based on the plurality of depth datasets, a 3D occupancy map that includes a set of voxels identified to be occupied by the resected piece of tissue, and may determine, during the surgical procedure and based on the 3D occupancy map, an estimated volume of the resected piece of tissue. Additionally, in order to provide some of the specific benefits described herein, this tissue volume detection system may be configured to compare, during the surgical procedure, the estimated volume of the resected piece of tissue with the expected volume of the resected piece of tissue, and to indicate, during the surgical procedure to a member of a surgical team (e.g., a surgeon) performing the surgical procedure, whether the estimated volume is within a predetermined threshold of the expected volume. As mentioned above, this may give valuable insight to the member of the surgical team regarding whether the resection has been successful and is complete, or whether more tissue is to be resected before the surgical procedure is brought to a close.

Along with these benefits of intraoperatively determining the volume of a resected piece of tissue, it will be understood that various other benefits and advantages may also arise from the use of systems and methods described herein, some of which may also arise if these systems and methods are performed after the surgical procedure is complete and/or the resected piece of tissue is fully extracted and removed from the body. For example, by measuring the volume of a resected piece of tissue in any of the ways described herein, accurate documentation for the surgical procedure may be recorded and provided to those who may be involved with the procedure in various ways. For instance, such documentation may be relevant to a patient upon whom the surgical procedure has been performed; a surgeon, surgical team member, or organization (e.g., hospital, etc.) associated with performing the surgical procedure; an insurance provider evaluating insurance claims related to the surgical procedure; or any other interested party having any suitable connection to the surgical procedure.

Additional detail will be described below regarding how tissue volume detection systems such as described above may employ various techniques to determine the volume of resected tissue during surgical procedures. While one particular volume detection technique (i.e., the technique described above involving accessing the depth datasets, generating the 3D occupancy map, and determining the estimated volume based on the 3D occupancy map) will be a primary area of focus in the following description, other suitable volume detection techniques will also be described herein and it will be understood that any volume detection technique described herein may be employed by itself as a standalone technique or may be combined with other techniques in any manner as may serve a particular implementation. For example, as will be described in more detail below, a particular volume detection technique may be employed as a primary volume detection technique and one or more additional volume detection techniques described herein may serve as secondary volume detection techniques that help to verify the accuracy of the primary volume detection technique, refine the results of the primary volume detection technique, or otherwise bolster and strengthen the efficacy of the volume detection performed using the primary volume detection technique.

While shorthand names may be used to refer to various volume detection techniques described herein, it will be understood that these shorthand names are meant as convenient labels only, and should not be interpreted as limiting in any way the breadth of possibilities of any particular volume detection technique or combination thereof that may be employed. Such shorthand names include: 1) an "occupancy map" volume detection technique such as described above and described in more detail below in relation to FIGS. 1-10 and 15; 2) an "interaction-based" volume detection technique that will be described in more detail below such as in relation to FIG. 11; 3) a "shrink-wrap-based" volume detection technique that will be described in more detail below such as in relation to FIG. 12; 4) a "force-sensing-based" volume detection technique that will be described in more detail below such as in relation to FIG. 13; and 5) a "cavity-based" volume detection technique that will be described in more detail below such as in relation to FIG. 14.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary tissue volume detection system 100 ("system 100") for determining a volume of resected tissue during a surgical procedure according to principles described herein. In certain examples, system 100 may be included in, implemented by, or connected to one or more components of a computer-assisted surgical system such as an exemplary computer-assisted surgical system that will be described below in relation to FIG. 2. For instance, in such examples, system 100 may be implemented by one or more components of a computer-assisted surgical system such as a manipulating system, a user control system, or an auxiliary system. In other examples, system 100 may be implemented by a stand-alone computing system (e.g., a stand-alone computing system communicatively coupled to a computer-assisted surgical system or implementing another non-surgical application or use case).

As shown in FIG. 1, system 100 may include, without limitation, a storage facility 102 and a processing facility 104 selectively and communicatively coupled to one another. Facilities 102 and 104 may each include or be implemented by one or more physical computing devices including hardware and/or software components such as processors, memories, storage drives, communication interfaces, instructions stored in memory for execution by the processors, and so forth. Although facilities 102 and 104 are shown to be separate facilities in FIG. 1, facilities 102 and 104 may be combined into fewer facilities, such as into a single facility, or divided into more facilities as may serve a particular implementation. In some examples, each of facilities 102 and 104 may be distributed between multiple devices and/or multiple locations as may serve a particular implementation.

Storage facility 102 may maintain (e.g., store) executable data used by processing facility 104 to perform any of the functionality described herein. For example, storage facility 102 may store instructions 106 that may be executed by processing facility 104 to perform one or more of the operations described herein. Instructions 106 may be implemented by any suitable application, software, code, and/or other executable data instance. Storage facility 102 may also maintain any data received, generated, managed, used, and/or transmitted by processing facility 104.

Processing facility 104 may be configured to perform (e.g., execute instructions 106 stored in storage facility 102 to perform) various operations associated with determining a volume of resected tissue during a surgical procedure. For instance, to use the occupancy map volume detection technique as one example, processing facility 104 may be configured to access, during a surgical procedure that involves resecting a piece of tissue from a body, a plurality of depth datasets for the resected piece of tissue. Each depth dataset in the plurality of depth datasets accessed by processing facility 104 may be captured as a different portion of a surface of the resected piece of tissue is presented to an imaging device by an instrument that holds the resected piece of tissue in a manner that sequentially presents the different portions of the surface to the imaging device. During the surgical procedure and based on the plurality of depth datasets, processing facility 104 may generate, in any of the ways described herein, a 3D occupancy map that includes a set of voxels identified to be occupied by the resected piece of tissue. Based on the 3D occupancy map (and also during the surgical procedure), processing facility 104 may determine (e.g., compute, calculate, estimate, etc.) an estimated volume of the resected piece of tissue.

In certain examples, processing facility 104 may be further configured to perform additional operations to help provide certain benefits and advantages described herein. For example, processing facility 104 may be configured to access (e.g., during the surgical procedure or prior to the commencement of the surgical procedure) an expected volume of the resected piece of tissue that has been determined prior to the surgical procedure (e.g., based on preoperative scanning and planning, etc.). Accordingly, after generating the 3D occupancy map and determining the estimated volume of the resected piece of tissue, and while the surgical procedure is still ongoing, processing facility 104 may be configured to compare the estimated volume of the resected piece of tissue with the expected volume of the resected piece of tissue, and to indicate (e.g., to a member of a surgical team performing the surgical procedure) whether the estimated volume is within a predetermined threshold of the expected volume.

As has been described, various implementations of system 100 may be configured to determine the volume of resected tissue during a surgical procedure. As used herein, an operation will be understood to be performed during a surgical procedure if the operation is performed while the surgical procedure is ongoing, such as before imaging equipment and/or surgical instruments that may be holding resected tissue are withdrawn from the body, before the body is stitched up and/or brought out of anesthesia (if applicable to the surgical procedure), and so forth. To this end, operations described herein may be performed in real time (i.e., performed immediately and without undue delay, such as by processing dynamic and time-sensitive data including captured depth data while the data remains relevant and up-to-date).

The operations described above, as well as other operations that may be performed by processing facility 104, are described in more detail herein. In the description that follows, any references to functions performed by system 100 may be understood to be performed by processing facility 104 based on instructions 106 stored in storage facility 102.

As used herein, a surgical procedure may include any medical procedure, including any diagnostic, therapeutic, or treatment procedure in which manual and/or instrumental techniques are used on a body of a patient or other subject to investigate or treat a physical condition. A surgical procedure may be performed at a surgical site that will be understood to include any volumetric space associated with the surgical procedure. For example, the surgical site may include any part or parts of a body of a patient or other subject of the surgery in a space associated with the surgical procedure. The surgical site may, in certain examples, be entirely disposed within the body and may include a space within the body near where a surgical procedure is being performed. For example, for a minimally invasive surgical procedure being performed on tissue internal to a patient, the surgical site may include the surface tissue, anatomy underlying the surface tissue, as well as space around the tissue where, for example, surgical instruments being used to manipulate the tissue to thereby perform the procedure are located. In other examples, the surgical site may be at least partially located external to the patient. For instance, for an open surgical procedure being performed on a patient, part of the surgical site may be internal to the patient while another part of the surgical site (e.g., a space around the tissue where one or more surgical instruments may be located) may be external to the patient.

Figure 2:
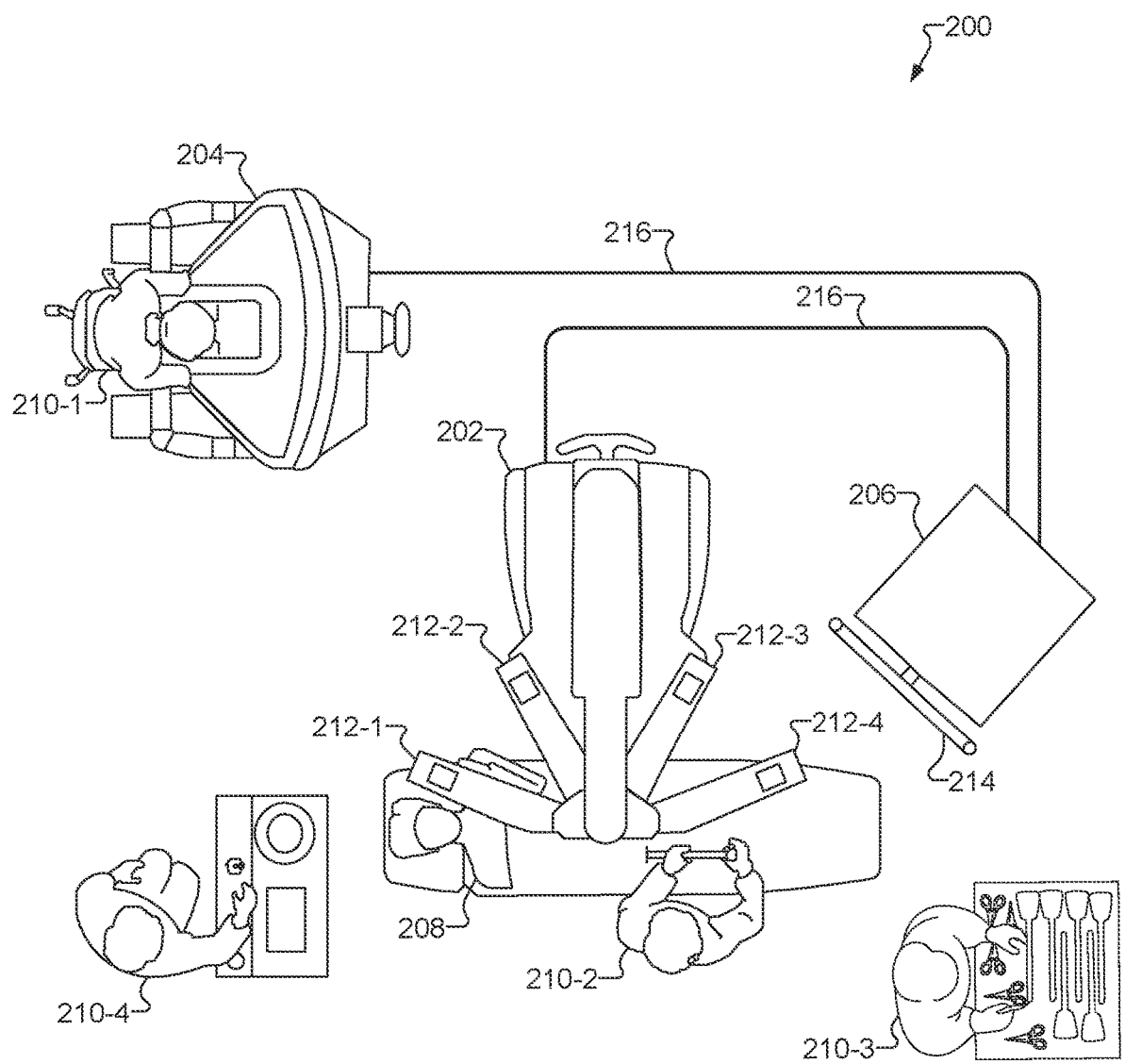
FIG. 2 illustrates an exemplary computer-assisted surgical system according to principles described herein.

FIG. 2 illustrates an exemplary computer-assisted surgical system ("surgical system 200"). As shown, surgical system 200 may include a manipulating system 202, a user control system 204 (also referred to herein as a surgeon console), and an auxiliary system 206 (also referred to herein as an auxiliary console) communicatively coupled one to another. Surgical system 200 may be utilized by a surgical team to perform a computer-assisted surgical procedure on a body of a patient 208. As shown, the surgical team may include a surgeon 210-1, an assistant 210-2, a nurse 210-3, and an anesthesiologist 210-4, all of whom may be collectively referred to as "surgical team members 210." Additional or alternative surgical team members may be present during a surgical session as may serve a particular implementation.

While FIG. 2 illustrates an ongoing minimally invasive surgical procedure, it will be understood that surgical system 200 may similarly be used to perform open surgical procedures or other types of surgical procedures that may similarly benefit from the accuracy and convenience of surgical system 200. Additionally, it will be understood that the surgical session throughout which surgical system 200 may be employed may not only include an operative phase of a surgical procedure, as is illustrated in FIG. 2, but may also include preoperative, postoperative, and/or other suitable phases of the surgical procedure.

As shown in FIG. 2, manipulating system 202 may include a plurality of manipulator arms 212 (e.g., manipulator arms 212-1 through 212-4) to which a plurality of surgical instruments and/or other tools (e.g., imaging devices such as an endoscope, an ultrasound tool, etc.) may be coupled. Each surgical instrument may be implemented by any suitable therapeutic instrument (e.g., a tool having tissue-interaction functions), diagnostic instrument, or the like that may be used for a computer-assisted surgical procedure on patient 208 (e.g., by being at least partially inserted into patient 208 and manipulated to perform a computer-assisted surgical procedure on patient 208). In some examples, one or more of the surgical instruments may include force-sensing and/or other sensing capabilities. In some examples, an imaging device may be implemented by an endoscopic device or another suitable imaging device such as an ultrasound module that is connected to or coupled with a surgical instrument. While manipulating system 202 is depicted and described herein as including four manipulator arms 212, it will be recognized that manipulating system 202 may include only a single manipulator arm 212 or any other number of manipulator arms as may serve a particular implementation.

Manipulator arms 212, as well as surgical instruments and/or imaging devices attached to manipulator arms 212, may include one or more displacement transducers, orientational sensors, and/or positional sensors used to generate raw (i.e., uncorrected) kinematics information. In some examples, system 100 and/or surgical system 200 may be configured to use the kinematics information to track (e.g., determine positions of) and/or control surgical instruments and/or imaging devices (as well as anything held by or connected to the instruments and/or imaging devices such as a retracted piece of tissue, a needle used for suturing or another such surgical tool, etc.).

User control system 204 may be configured to facilitate control by surgeon 210-1 of manipulator arms 212 and surgical instruments and/or imaging devices attached to manipulator arms 212. For example, surgeon 210-1 may interact with user control system 204 to remotely move or manipulate manipulator arms 212 and the instruments or devices attached thereto. To this end, user control system 204 may provide surgeon 210-1 with imagery of a surgical site associated with patient 208 as captured by an imaging device. In certain examples, user control system 204 may include a stereo viewer having two displays where stereoscopic images of a surgical site associated with patient 208 and generated by a stereoscopic imaging device may be viewed by surgeon 210-1. Captured imagery, as well as data or notifications generated by system 100, may be displayed by user control system 204 to facilitate surgeon 210-1 in performing one or more procedures with surgical instruments attached to manipulator arms 212.

To facilitate control of surgical instruments and imaging devices during the surgical procedure, user control system 204 may include a set of master controls. These master controls may be manipulated by surgeon 210-1 to control movement of instruments and/or imaging devices such as by utilizing robotic and/or teleoperation technology. The master controls may be configured to detect a wide variety of hand, wrist, and finger movements by surgeon 210-1. In this manner, surgeon 210-1 may intuitively perform a procedure using one or more surgical instruments and imaging devices.

Auxiliary system 206 may include one or more computing devices configured to perform primary processing operations of surgical system 200. In such configurations, the one or more computing devices included in auxiliary system 206 may control and/or coordinate operations performed by various other components (e.g., manipulating system 202 and user control system 204) of surgical system 200. For example, a computing device included in user control system 204 may transmit instructions to manipulating system 202 by way of the one or more computing devices included in auxiliary system 206. As another example, auxiliary system 206 may receive (e.g., from manipulating system 202) and may process image data representative of imagery captured by an imaging device.

In some examples, auxiliary system 206 may be configured to present visual content to surgical team members 210 who may not have access to the images provided to surgeon 210-1 at user control system 204. To this end, auxiliary system 206 may include a display monitor 214 configured to display captured imagery, one or more user interfaces, notifications or information generated by system 100, information associated with patient 208 and/or the surgical procedure, and/or any other visual content as may serve a particular implementation. In some examples, display monitor 214 may display augmented reality images of the surgical site that includes live video capture together with augmentations such as textual and/or graphical content (e.g., anatomical models generated preoperatively, contextual information, etc.) concurrently displayed with the images. In some embodiments, display monitor 214 is implemented by a touchscreen display with which surgical team members 210 may interact (e.g., by way of touch gestures) to provide user input to surgical system 200.

Manipulating system 202, user control system 204, and auxiliary system 206 may be communicatively coupled one to another in any suitable manner. For example, as shown in FIG. 2, manipulating system 202, user control system 204, and auxiliary system 206 may be communicatively coupled by way of control lines 216, which may represent any wired or wireless communication link as may serve a particular implementation. To this end, manipulating system 202, user control system 204, and auxiliary system 206 may each include one or more wired or wireless communication interfaces, such as one or more local area network interfaces, Wi-Fi network interfaces, cellular interfaces, etc.

Figure 3:
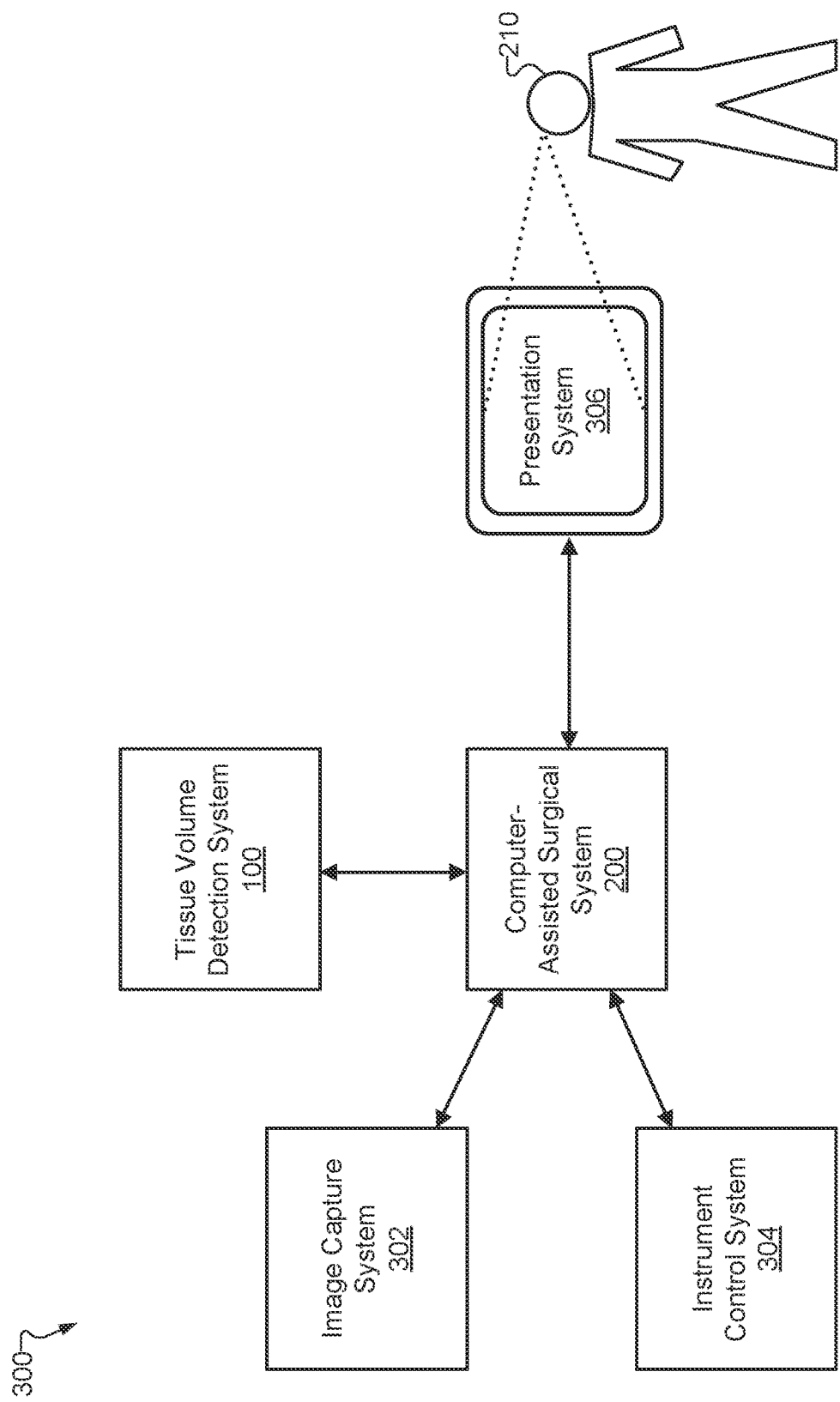
FIG. 3 illustrates an exemplary block diagram showing how the tissue volume detection system of FIG. 1 may, along with other systems, integrate and/or interoperate with the computer-assisted surgical system of FIG. 2 according to principles described herein.

FIG. 3 illustrates an exemplary block diagram 300 showing how system 100 may, along with other systems, integrate and/or interoperate with surgical system 200. Specifically, as shown, block diagram 300 depicts an image capture system 302, an instrument control system 304, and a presentation system 306 that are integrated or coupled, together with system 100, with surgical system 200.

In various embodiments, system 100 may be implemented by or integrated into surgical system 200, while in other embodiments, system 100 may be separate from but communicatively coupled to surgical system 200. For example, system 100 may receive input from and provide output to surgical system 200 and/or may access imagery of a surgical site, information about the surgical site, and/or information about surgical system 200 from surgical system 200. System 100 may use this accessed imagery and/or information to perform any of the volume detection techniques described herein to determine a volume of resected tissue during a surgical procedure. In a similar manner, image capture system 302, instrument control system 304, presentation system 306, and/or any combination thereof may be implemented by (e.g. integrated into) surgical system 200 or, if separate from surgical system 200, may be communicatively coupled therewith and controlled by processing resources of surgical system 200. Each of systems 302 through 306 will now be described in more detail.

Image capture system 302 may include an endoscope or another suitable imaging device, as well as, in certain examples, computing resources configured to process data (e.g., image data, video data, depth data, metadata, etc.) captured by the imaging device and/or to generate and provide such data to system 100. In certain examples, an imaging device included within image capture system 302 may be implemented as a stereoscopic imaging device (e.g., a stereoscopic endoscope) that includes stereoscopic imaging elements such as twin capture elements disposed at a preconfigured distance apart so as to provide image data configured to leverage the stereoscopic vision of the surgeon using the stereoscopic endoscope to view the surgical site. In such implementations, system 100 may perform the accessing of the plurality of depth datasets by generating each of the plurality of depth datasets. For example, the depth datasets may be generated by determining depth data for the respective portion of the surface of the resected piece of tissue using a stereoscopic depth detection technique that employs the stereoscopic imaging elements of the stereoscopic imaging device. For instance, system 100 may correlate surface points captured by each of the stereoscopic imaging elements from their respective vantage points, and triangulate (e.g., based on the known preconfigured distance between the vantage points of the two imaging elements) how far each of these surface points are from the imaging device. In this way, image capture system 302 may detect and provide, along with captured image data, depth data representative of the surgical site (e.g., including any instruments and/or resected tissue that may be present) to system 100 (e.g., by way of surgical system 200).

In certain examples, image capture system 302 may include a monoscopic imaging device rather than a stereoscopic imaging device. In these or other examples, other depth detection techniques may be employed to generate the plurality of depth datasets that image capture system 302 provides to system 100. For example, together with one or more imaging devices configured to capture image data representative of the surgical scene, image capture system 302 may also include or implement one or more depth capture devices that operate on principles such as time-of-flight depth detection or the like. Depth datasets that are generated by image capture system 302 and to which access is provided for system 100 will be described in more detail below.

Instrument control system 304 may include or be implemented by any suitable surgical instrumentation and/or processing or control resources used to facilitate use of the instrumentation as may serve a particular implementation. For instance, in some examples, instrument control system may include one or more tissue manipulation instruments (e.g., cutting instruments, grasping instruments, etc.) configured for use during a surgical procedure to resect a piece of tissue and/or to hold the resected piece of tissue in a manner that sequentially presents different portions of the surface of the resected piece of tissue to an imaging device included within image capture system 302. In some implementations, instrument control system 304 may include force sensors such as displacement transducers, orientational sensors, and/or positional sensors that detect the amount of force required to hold and move objects held by the instruments (e.g., resected pieces of tissue) and that are used to generate raw kinematics information for use in any of the ways described herein.

Presentation system 306 may include or be implemented by any suitable display screen and/or processing resources used to present information to a user such as surgical team member 210, who may represent, for example, surgeon 210-1 or any other member of the team performing the surgical procedure. In some examples, system 100 may be configured to present information by way of presentation system 306. For example, system 100 may provide, using presentation system 306 during the surgical procedure, the estimated volume of the resected piece of tissue for presentation to the surgical team member 210.

Figure 4:
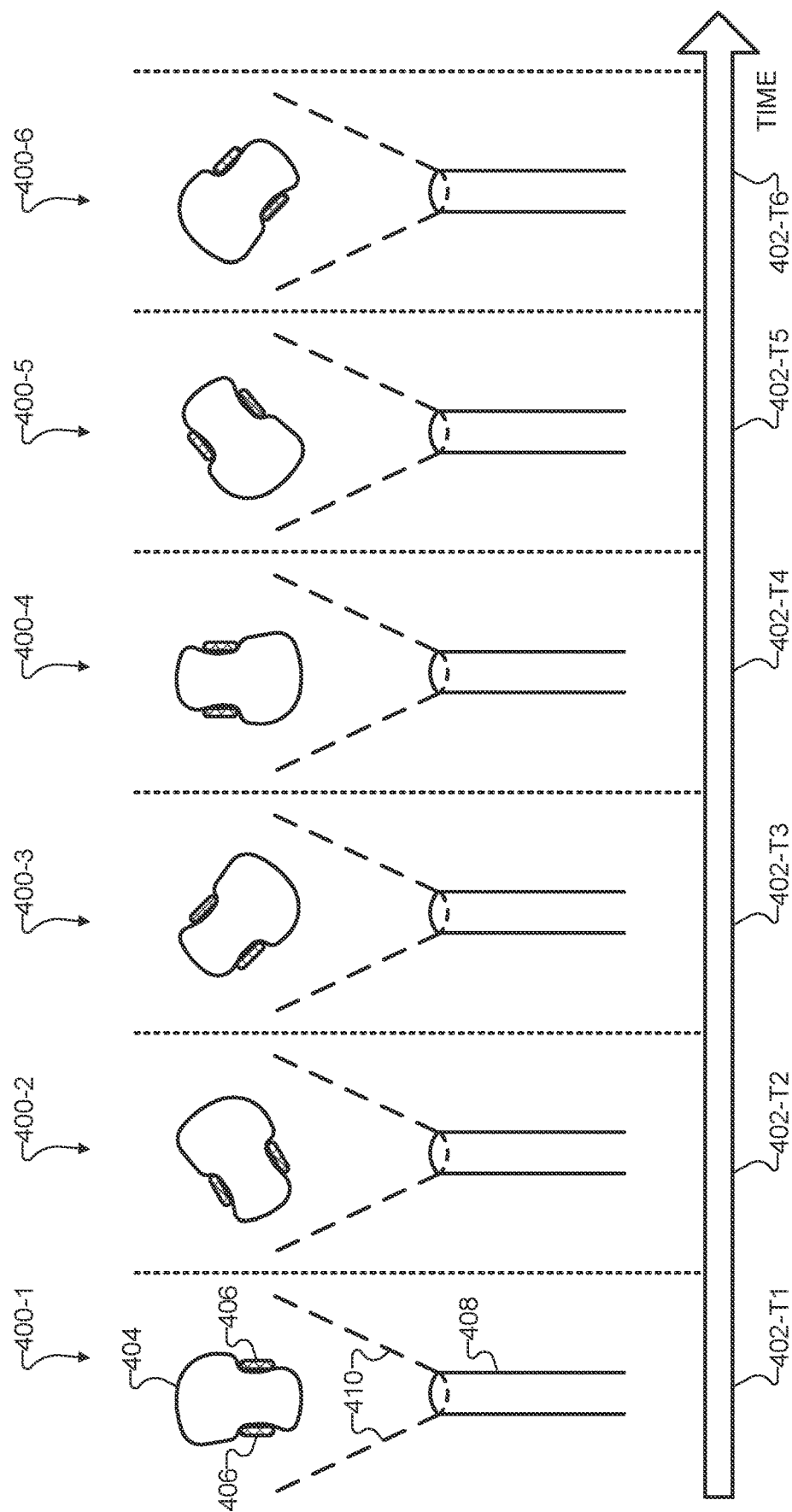
FIG. 4 illustrates exemplary aspects of how a plurality of depth datasets may be captured as different portions of a surface of a resected piece of tissue are presented to an imaging device according to principles described herein.
Figure 5:
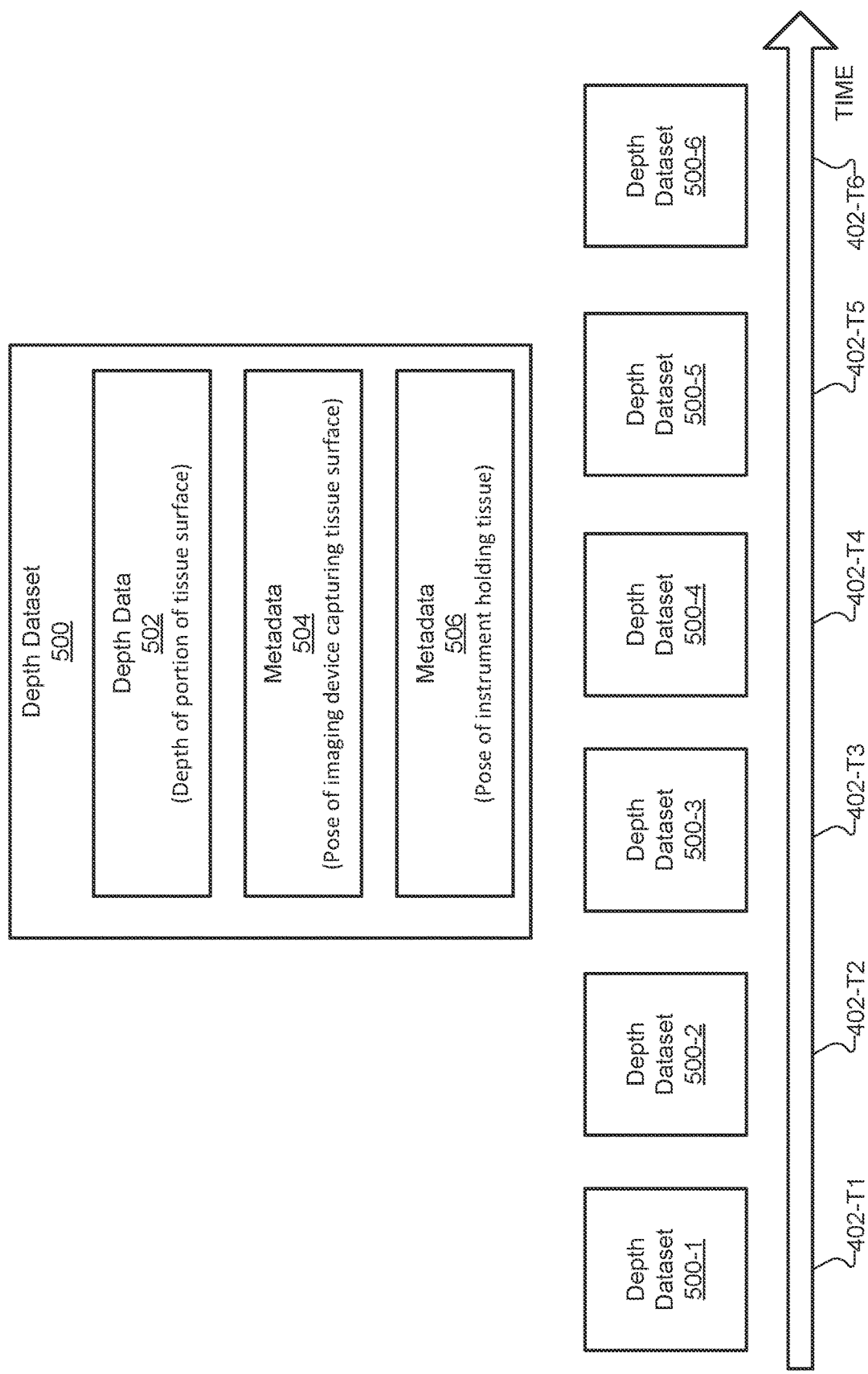
FIG. 5 illustrates an exemplary plurality of depth datasets and exemplary content that may be included therein according to principles described herein.
Figure 6:
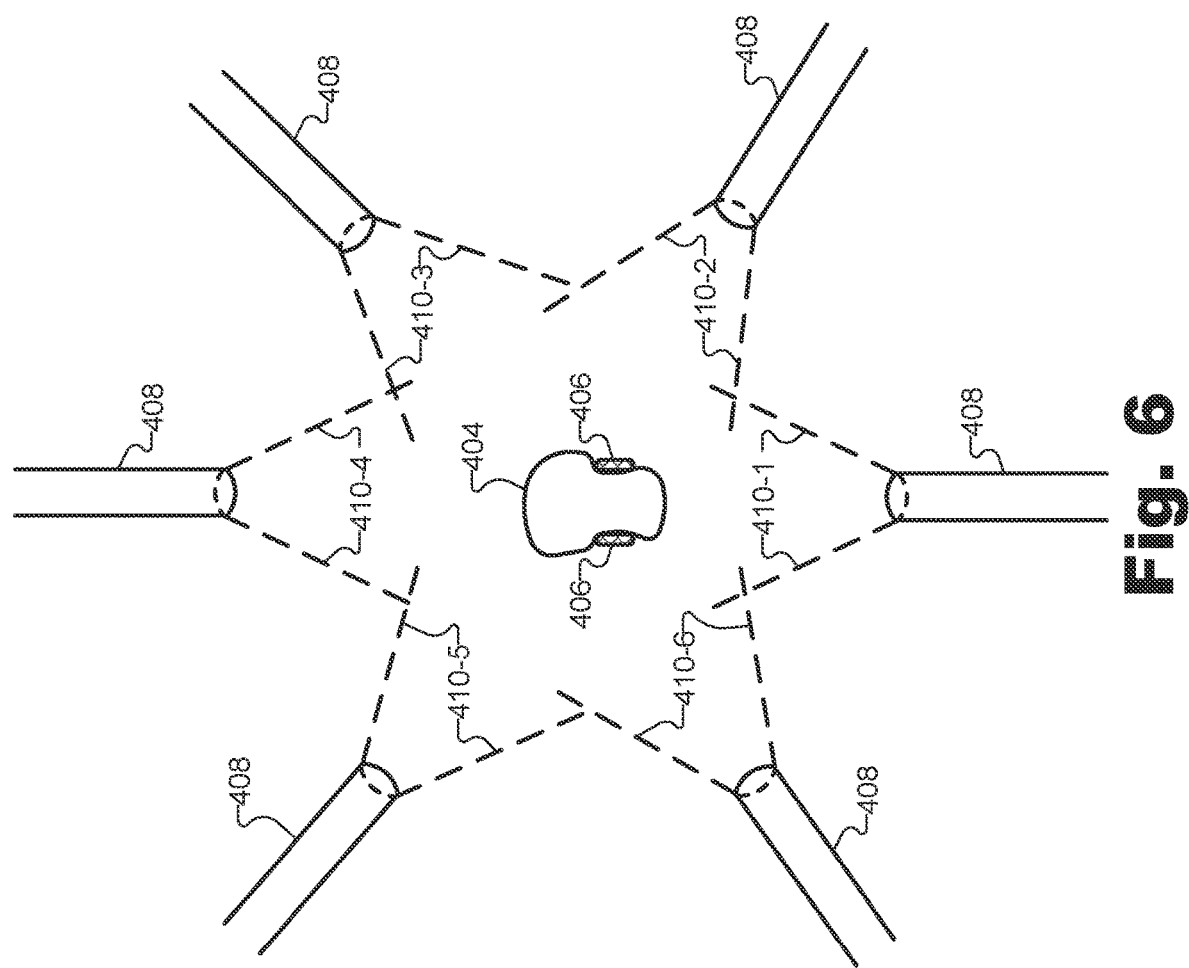
FIG. 6 illustrates an exemplary manner in which the plurality of depth datasets of FIG. 5 may collectively include depth data representative of an entirety of the surface of the resected piece of tissue according to principles described herein.

FIGS. 4-6 illustrate various aspects of how the various systems shown in block diagram 300 may interoperate to capture, generate, and/or otherwise access or provide access to, a plurality of depth datasets for a particular resected piece of tissue. More particularly, FIG. 4 shows exemplary aspects of how a plurality of depth datasets may be captured as different portions of a surface of a resected piece of tissue are presented to an exemplary imaging device, FIG. 5 shows an exemplary plurality of depth datasets and exemplary content that may be included therein, and FIG. 6 shows an exemplary manner in which the plurality of depth datasets of FIG. 5 may collectively include depth data representative of an entirety of the surface of the resected piece of tissue.

Referring to FIG. 4, a plurality of snapshots 400 (e.g., snapshots 400-1 through 400-6) are shown at respective moments in time 402 (e.g., moments 402-T1 through 402-T6) along a timeline. As indicated by reference numbers in snapshot 400-1, each of the six snapshots 400 depict a resected piece of tissue 404 that is held by a surgical instrument 406. It will be understood that, from the vantage point shown in snapshots 400, resected piece of tissue 404 is positioned so as to obscure most of instrument 406 such that only the tips of grasping elements of the instrument can be seen; however, other vantage points showing more of instrument 406 are illustrated in other figures herein. Additionally, each of snapshots 400 depict an imaging device 408 (e.g., a stereoscopic endoscope) that has a view of resected piece of tissue 404 and instrument 406 in accordance with a field of view 410.

It will be understood that each of the elements shown at each moment 402 in time are exemplary elements only and may be implemented in any manner as may serve a particular implementation. For instance, resected piece of tissue 404 may be implemented as any tissue mass (e.g., a resected mass, an excised mass, etc.) or other object for which it is desirable to determine a volume, and instrument 406 may be implemented by any surgical instrument or other object configured to hold resected piece of tissue 404 in a manner that allows the tissue to be rotated and presented to imaging device 408 as shown. Similarly, imaging device 408 may be implemented as any suitable imaging device included within image capture system 302 and configured to be used to capture imagery and/or depth data associated with a surgical site during a surgical procedure. Field of view 410 may be any suitable field of view, including a field of view narrower or wider than shown in FIG. 4.

When instrument 406 presents resected piece of tissue 404 to imaging device 408 in each of the respective orientations shown in snapshots 400-1 through 400-6, image capture system 302 may use imaging device 408 to capture a respective depth dataset for resected piece of tissue 404. As described above, system 100 may direct the capture and generation of these depth datasets and may access the plurality of depth datasets from image capture system 302 as the depth data is being captured.

To illustrate, FIG. 5 shows an exemplary plurality of depth datasets 500 (e.g., depth datasets 500-1 through 500-6) along the same timeline shown in FIG. 4 to indicate the respective moments 402 at which each depth dataset is captured. Accordingly, it will be understood that depth dataset 500-1 is captured at moment 402-T1, when one particular portion of the surface of resected piece of tissue 404 is presented to imaging device 408, depth dataset 500-2 is captured at moment 402-T2, when a different (but overlapping) portion of the surface of resected piece of tissue 404 is presented to imaging device 408, and so forth.

Above the timeline and the individual depth datasets 500, FIG. 5 further illustrates a generic depth dataset 500 that indicates exemplary types of data that may be included in any or all of the individual depth datasets 500-1 through 500-6. Specifically, as shown, each depth dataset 500 in the plurality of depth datasets may include, for a respective portion of the surface of resected piece of tissue 404: depth data 402 representative of the respective portion of the surface ("Depth of portion of tissue surface"); metadata 504 representative of a pose of imaging device 408 as the respective portion of the surface of resected piece of tissue 404 is presented to imaging device 408 by instrument 406 ("Pose of imaging device capture tissue surface"); and metadata 506 representative of a pose of instrument 406 as the respective portion of the surface of resected piece of tissue 404 is presented to imaging device 408 by instrument 406 ("Pose of instrument holding tissue").

While certain parts of (or in some implementations, an entirety of) depth datasets 500 may be generated by image capture system 302 based on data captured by imaging device 408, it will be understood that other data included in certain depth datasets 500 may be generated by other systems such as instrument control system 304. For example, some or all of metadata 504 and/or 506 may be represented with respect to a localized or global coordinate system and generated based on kinematic or other data tracked by instrument control system 304. Instrument control system 304 may track, for example, the respective locations of instrument 406 with respect to imaging device 408, or may track both of these locations with respect to a particular coordinate system. As will be described and illustrated in more detail below, all of the data 502 through 506 included in the plurality of depth datasets 500 may be analyzed and collectively used to generate a 3D occupancy map that system 100 may employ to determine an estimated volume of resected piece of tissue 404.

Returning to FIG. 4, the respective snapshots 400 show that, at each moment 402, instrument 406 presents a different portion of the surface of resected piece of tissue 404 to imaging device 408 by sequentially rotating the different portions toward field of view 410 as time proceeds. Specifically, as shown, instrument 406 presents one portion of the surface of resected piece of tissue 404 to imaging device 408 at moment 402-T1 (see snapshot 400-1) and then rotates resected piece of tissue 404 over time such that all the other portions of resected piece of tissue 404 are sequentially presented to imaging device 408 (see snapshots 400-2 through 400-6). Ultimately, by capturing respective depth datasets 500 at each moment 402 as resected piece of tissue 404 is sequentially presented to imaging device 408 in this way, system 100 may gain access to sufficient data to generate a 3D occupancy map of resected piece of tissue 404 that will allow for the volume of resected piece of tissue 404 to be determined (i.e., accurately estimated). That is, due to the rotation of resected piece of tissue 404 shown in FIG. 4, the plurality of depth datasets 500 accessed by system 100 for resected piece of tissue 404 may collectively include depth data representative of an entirety of the surface of resected piece of tissue 404.

To illustrate, FIG. 6 shows a representation of the depth and image capture performed by imaging device 408 if the depth and image capture were performed simultaneously by multiple imaging devices 408 rather than, as is actually the case in FIG. 4, by being performed individually over a period of time by an individual imaging device 408. Specifically, FIG. 6 shows resected piece of tissue 404 and instrument 606 in the center of a plurality of imaging devices 408 that each are associated with a different field of view 410 (i.e., fields of view 410-1 through 410-6). Fields of view 410-1 through 410-6 correspond, respectively, to the field of view 410 of imaging device 408 as shown in FIG. 4 at each of the six different moments 402 along the timeline. As shown, the six fields of view 410 are collectively able to capture the entirety of the surface of resected piece of tissue 404 from angles all around resected piece of tissue 404. It will be understood that, while the different vantage points of each field of view 410 are shown in only two dimensions for convenience of illustration in FIGS. 4 and 6, three-dimensional vantage points around resected piece of tissue 404 may be employed to capture the entire surface of resected piece of tissue 404 in three dimensions.

As will now be described in more detail, depth datasets captured to collectively represent (such as illustrated in FIG. 6) all the portions of the surface of resected piece of tissue 404 may be processed by system 100 to generate a 3D occupancy map upon which a volume estimate of resected piece of tissue 404 may be based. Such a 3D occupancy map may be generated in any suitable manner. For instance, in certain implementations, system 100 may generate a 3D occupancy map by performing a raytracing operation.

As used herein, a raytracing operation may involve a set of virtual rays simulated to extend from a point associated with the imaging device to various points of intersection in the body upon which the surgical procedure is being performed. In some examples, such a raytracing operation may include determining that one or more virtual rays of the set of virtual rays intersect with one or more points on the surface of resected piece of tissue 404 and that one or more other virtual rays of the set of virtual rays are determined not to intersect with the surface of resected piece of tissue 404. Accordingly, based on the raytracing operation, system 100 may allocate, within a voxel data structure stored by the system to implement the 3D occupancy map, a respective occupied voxel for each of the points on the surface of resected piece of tissue 404 with which a virtual ray is determined to intersect as part of the raytracing operation.

Figure 7:
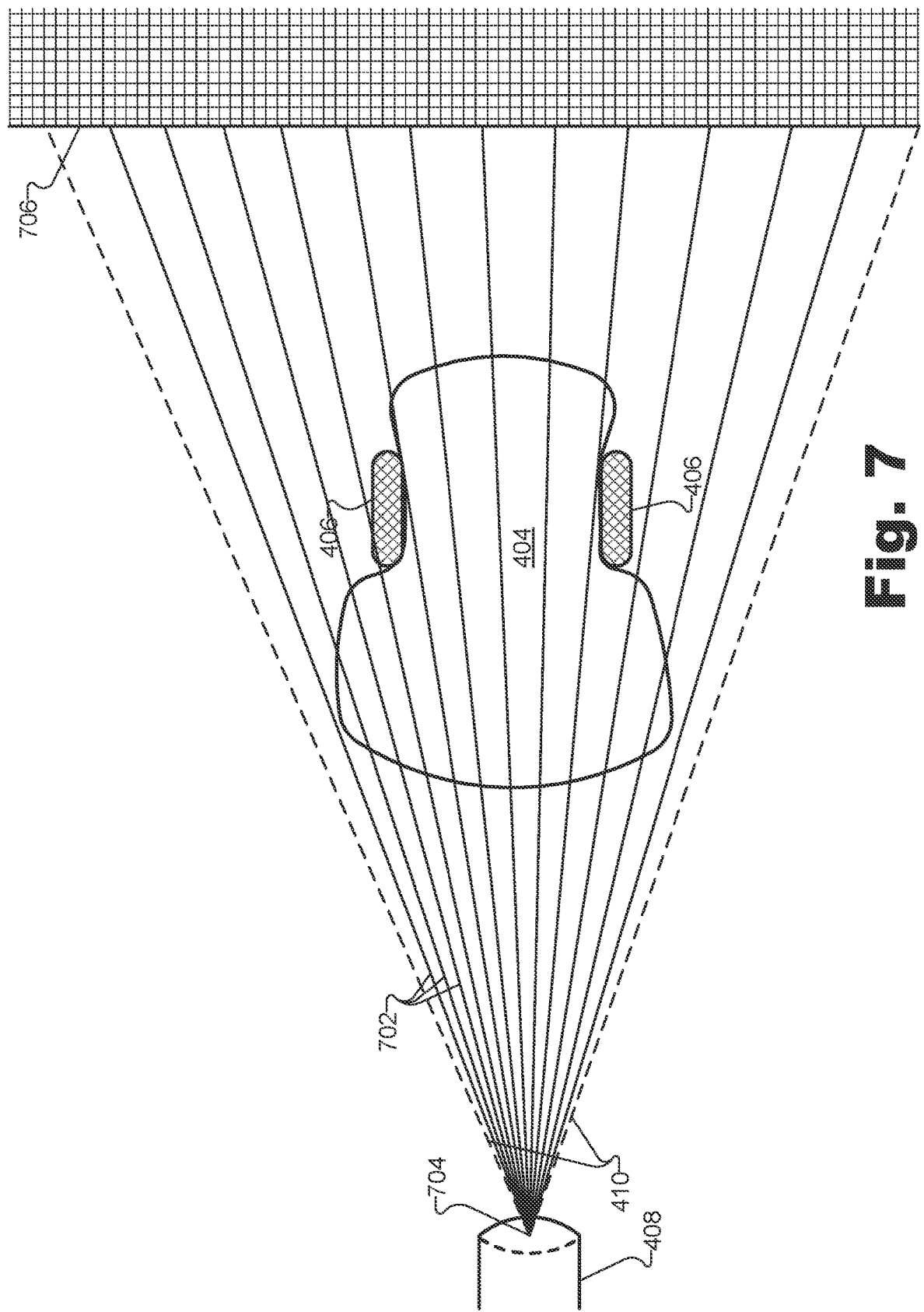
FIGS. 7-10 illustrate exemplary aspects of how a raytracing operation may be performed to generate an exemplary 3D occupancy map according to principles described herein.
Figure 8:
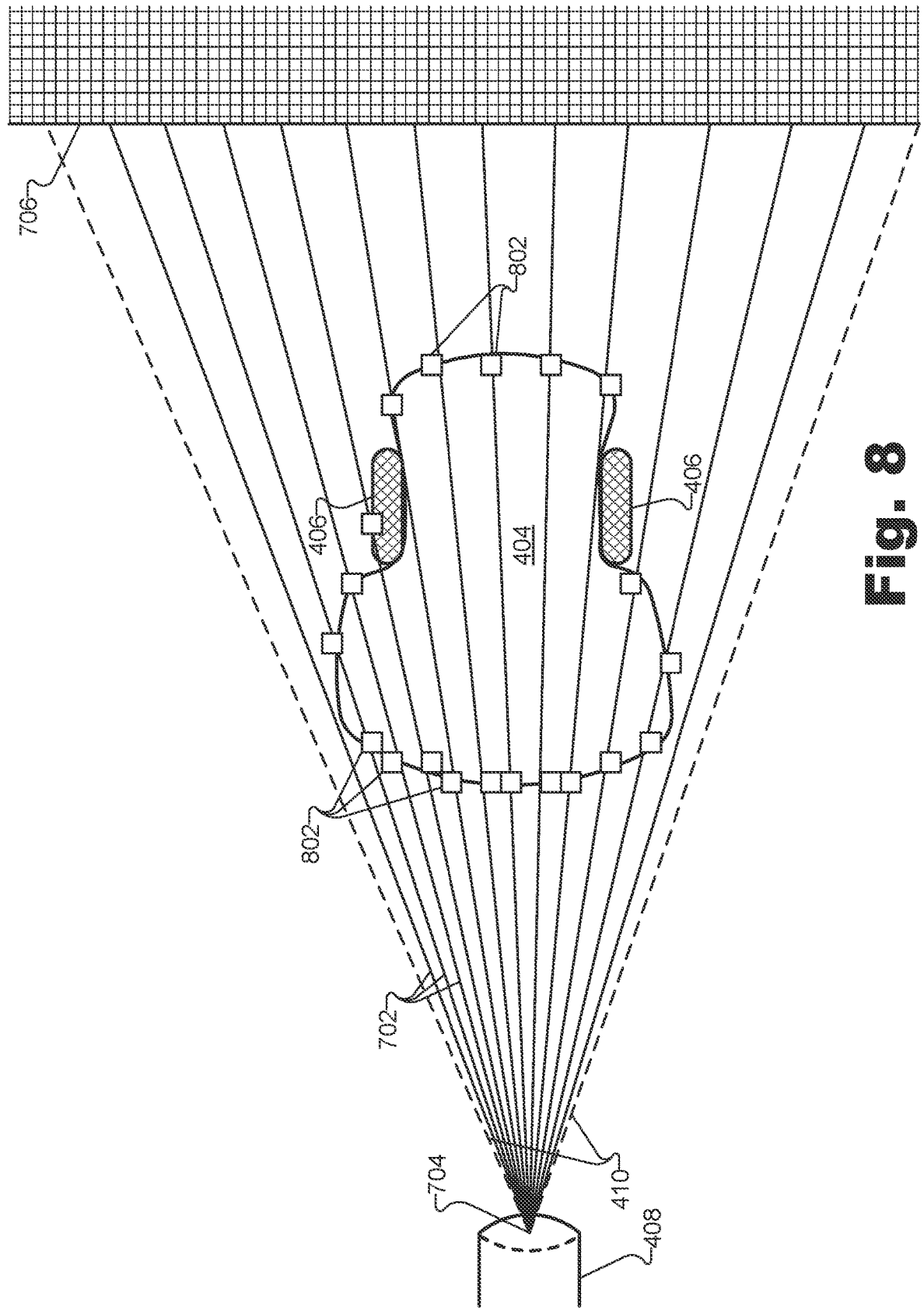
Figure 9:
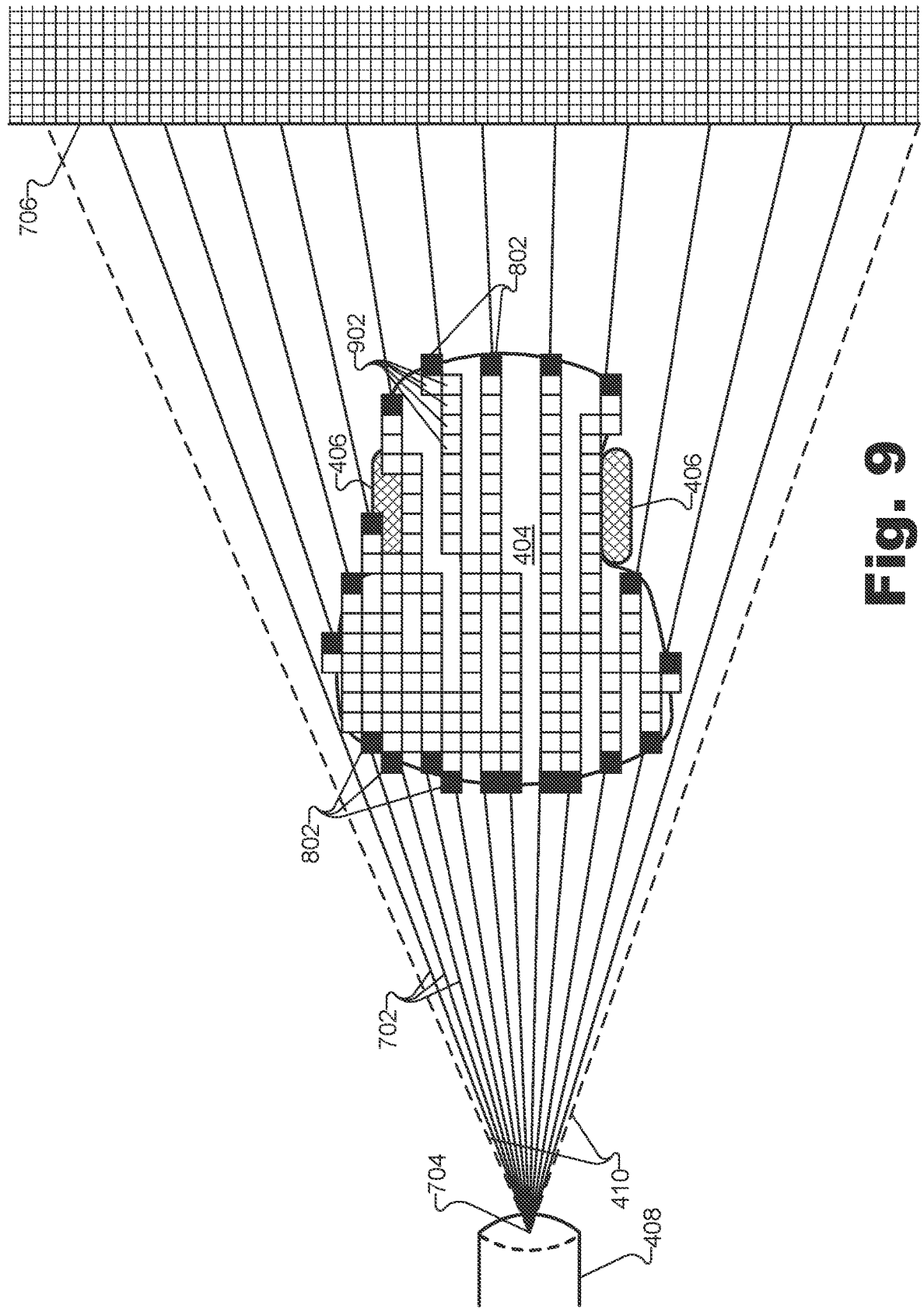
Figure 10:
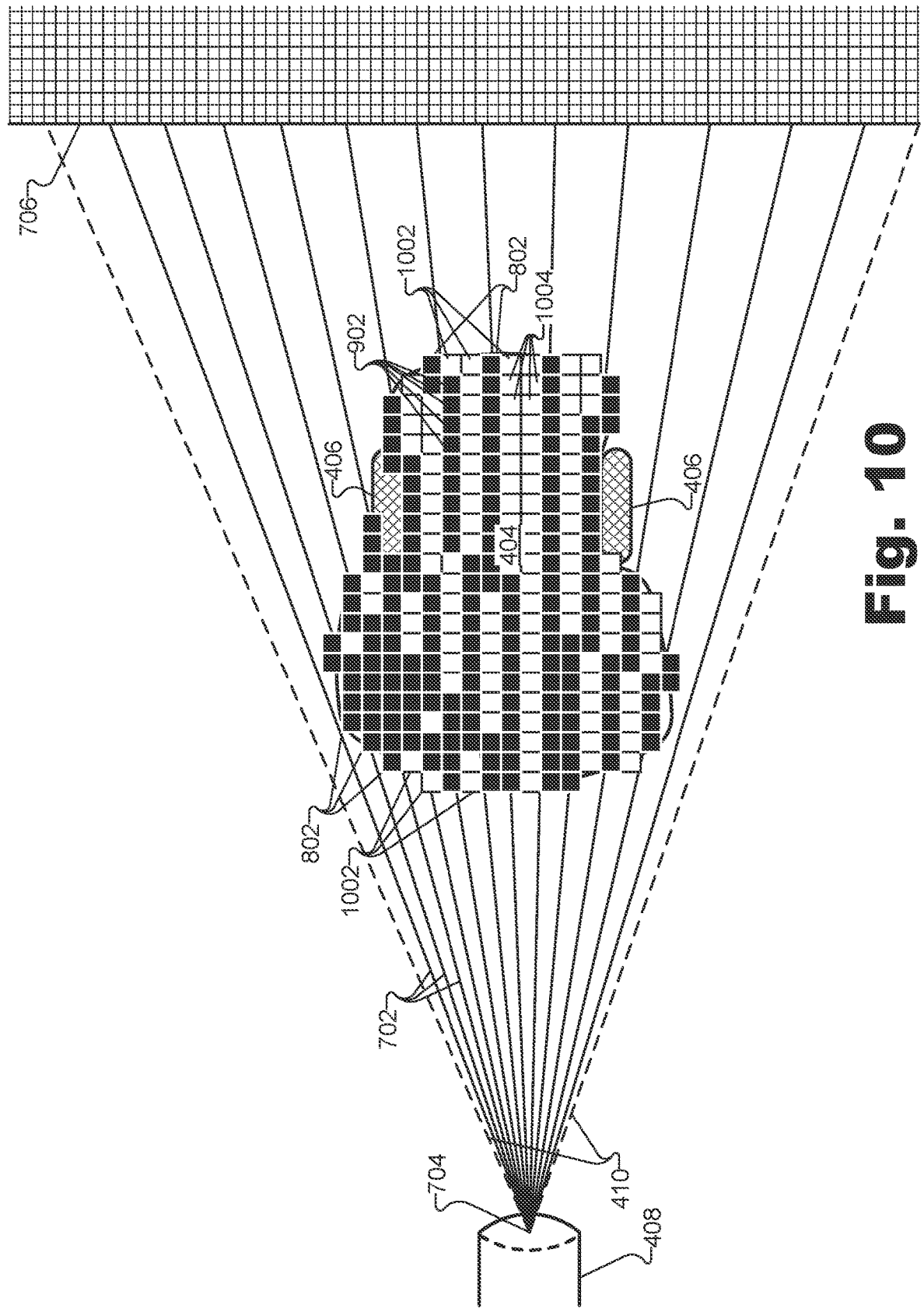

To illustrate, FIGS. 7-10 illustrate exemplary aspects of how system 100 may implement a raytracing operation to generate a 3D occupancy map. More particularly, FIG. 7 shows an exemplary set of virtual rays used for a raytracing operation involving resected piece of tissue 404, instrument 406, and imaging device 408, while each of FIGS. 8-10 show a representation of a 3D occupancy map (e.g., a 3D occupancy map implemented by a voxel data structure) superimposed over the elements of FIG. 7 to thereby illustrate how the raytracing technique operates to voxelize resected piece of tissue 404 based on depth datasets 500.

Referring to FIG. 7, the raytracing operation being performed by system 100 (e.g., being directed by system 100 and implemented using various elements of other systems described herein such as image capture system 302) is shown to include a set of virtual rays 702. As shown, virtual rays 702 are simulated to extend from a point 704 that is associated with imaging device 408. While only a few virtual rays 702 are explicitly labeled in FIG. 7, each of the virtual rays shown in FIG. 7 to be extending from point 704 may be understood to be included in the set of virtual rays 702. In this example, point 704 is shown to be at a location in the center of the proximal tip of imaging device 408. In this way, as shown, virtual rays 702 extending from point 704 may align with and be distributed across field of view 410 of imaging device 408.

Each of virtual rays 702 is shown to extend from point 704 to one or more points of intersection in the body (e.g., surface points of surfaces at the surgical site where the virtual ray 702 intersects). For example, the points of intersection with which virtual rays 702 intersect include points on the surface of resected piece of tissue 404, points on the surface of instrument 406, and points on the surface of a background 706 that represents other tissue and/or objects present at the surgical site (i.e., tissue and/or objects other than resected piece of tissue 404 and the surgical instrument 406 that is holding resected piece of tissue 404). The raytracing operation illustrated by FIG. 7 may include determining, by system 100 based on depth datasets 500, that one or more virtual rays 702 of the set of virtual rays 702 intersect with one or more points on the surface of resected piece of tissue 404 (or intersect with one or more points on the surface of instrument 406 that are contiguous with resected piece of tissue 404), and determining that one or more other virtual rays 702 of the set of virtual rays 702 do not intersect with the surface of resected piece of tissue 404 (or of instrument 406).

When a particular ray 702 is determined to intersect with a surface of resected piece of tissue 404 or instrument 406, system 100 may allocate a voxel within a voxel data structure implementing a 3D occupancy map, whereas, when a particular ray 702 is determined to intersect with the surface of background 706, system 100 may abstain from allocating a voxel within the voxel data structure. To illustrate, FIG. 8 shows all the same elements illustrated in FIG. 7 together with a plurality of voxels 802 overlaid onto intersection points of virtual rays 702 with the surfaces at the surgical site. Voxels 802 are shown in FIG. 8 to illustrate a visual representation of data that system 100 may allocate in a voxel data structure that is stored by system 100 to implement a 3D occupancy map. For example, system 100 may store such a voxel data structure within storage facility 102 or within another such storage facility to which system 100 has access. While shown in two dimensions for clarity of illustration in FIG. 8, it will be understood that each voxel 802 (as well as other voxels that will be depicted in FIGS. 9 and 10 below), may be implemented as a cube associated with a particular point in three dimensional space in accordance with a coordinate system (e.g., a coordinate system associated with the surgical site).

By allocating each voxel 802, system 100 effectively stores data indicating that the particular 3D point at the surgical site is occupied, while other 3D points at the surgical site that system 100 abstains from allocating are indicated to be unoccupied. Accordingly, as shown, different allocated voxels 802 (which will be understood to refer to all of the small squares shown in FIG. 8 and not only the ones explicitly labeled 802) are stored to correspond to each intersection point of each virtual ray 702 and each surface, based on the depth datasets for resected piece of tissue 404 generated and accessed in the ways described above.

Whenever virtual rays 702 are detected to intersect with intersection points on a surface, system 100 may be configured to segment intersections with resected piece of tissue 404 and intersections with other objects at the surgical site for which the volume is not being determined. This segmentation may be performed in any suitable manner, such as, for example, by using machine learning technology that is trained, based on previous surgical procedures, to differentiate tissue from various components of surgical instruments (e.g., the jaw, the wrist, the shaft, etc.) and/or other objects that may be present at the surgical site. Additionally, machine learning and/or depth data may be used during the segmentation process to differentiate tissue of resected piece of tissue 404 from tissue that may be present within background 706.

System 100 may use any of various suitable techniques to account for the volume of instrument 406 so as to avoid including the volume of instrument 406 with the final volume estimation for resected piece of tissue 404. For example, one such technique may involve accessing predetermined volume data for instrument 406 or specific components thereof (e.g., the grasping elements or jaws of the instrument). Such volume data may be accessible as part of a computer-aided design ("CAD") model that is available for instrument 406, or the volume data may have been previously measured and stored in a storage location that is accessible to system 100. In such an example, system 100 may treat instrument 406 (or at least the specific components thereof) as being part of the volume of resected piece of tissue 404 during the raytracing operation, and may later subtract the known, predetermined volume of the instrument to accurately estimate the volume of only resected piece of tissue 404.

As another example, system 100 may account for instrument 406 based on known dimensions of instrument 406 (e.g., from the CAD model or the like). For instance, system 100 may detect (e.g., using machine learning or another suitable technology as described above) when an intersection point is on the surface of instrument 406, and, in response, may account for the known thickness of instrument 406 to allocate a voxel 802 where the corresponding tissue intersection point should be.

As raytracing is performed to map out entrance points and exit points of virtual rays 702 virtually passing into and then back out of resected piece of tissue 404, an assumption may be made that resected piece of tissue 404 is solid (i.e., rather than hollow), such that voxels along the virtual ray 702 between the entrance and exit intersection points may also be allocated as occupied voxels. More specifically, system 100 may determine that at least one of virtual rays 702 intersects with a first point on the surface of resected piece of tissue 404, and may further determine that the virtual ray 702 intersects, after passing through resected piece of tissue 404, with a second point on the surface of resected piece of tissue 404. Accordingly, system 100 may continue generating the 3D occupancy map by allocating, within the voxel data structure, additional occupied voxels associated with respective internal points disposed within resected piece of tissue 404 between the first and second points on the surface of resected piece of tissue 404.

To illustrate, FIG. 9 shows all the same occupied voxels 802 that are shown in FIG. 8 together with various internal occupied voxels 902 that are filled in along each virtual ray 702 between entry and exit points of the virtual ray 702 as it passes through resected piece of tissue 404. In order to differentiate occupied voxels 802 from occupied voxels 902 in the illustration (since it is not practical for every voxel of either type to be explicitly labeled), occupied voxels 802 are shaded in black in FIG. 9 while occupied voxels 902 are left unshaded in white.

In addition to allocating voxels 802 for surface points of resected piece of tissue 404 and allocating voxels 902 for internal points of resected piece of tissue 404, system 100 may be further configured to automatically fill in other holes in the voxel data structure that may not be explicitly intersected or traversed by any virtual ray 702 in the set of virtual rays 702, but that may nevertheless be likely to be occupied by the resected piece of tissue 404. For example, system 100 may, as part of the generating of the 3D occupancy map, allocate one or more additional occupied voxels within the voxel data structure for one or more points on the surface of resected piece of tissue 404 that meet certain criteria. Specifically, for example, system 100 may allocate the one or more additional occupied voxels for surface points of resected piece of tissue 404 that 1) are not determined by the raytracing operation to intersect with a virtual ray 702 of the set of virtual rays 702, and 2) are disposed between at least two points on the surface of resected piece of tissue 404 that are determined by the raytracing operation to intersect with virtual rays 702 of the set of virtual rays 702. In this way, system 100 may "smooth out" a surface of a voxelized representation of resected piece of tissue 404 in the 3D occupancy map by making an assumption that most surface points will be similar to neighboring surface points even if the resolution of virtual rays is not great enough to capture every possible surface point.

Similarly, once these additional surface points have been filled in such that the 3D occupancy map includes a voxelized representation of resected piece of tissue 404 with a contiguous outer surface, certain additional internal voxels may similarly be filled in to make the voxelized representation solid with no hollow areas.

To illustrate, FIG. 10 shows all the same occupied voxels 802 and 902 that have been introduced and described in FIGS. 8 and 9, together with various additional surface voxels 1002 and additional internal voxels 1004 that are filled in in accordance with the smoothing function described above or another suitable smoothing or gap-filling function. In order to differentiate occupied voxels 802 and 902 from occupied voxels 1002 and 1004 in the illustration (since it is not practical for every voxel of any of these categories to be explicitly labeled), occupied voxels 802 and 902 are shaded in black in FIG. 10 while occupied voxels 1002 and 1004 are left unshaded in white.

As shown in two dimensions in FIG. 10, after system 100 performs the raytracing operation to generate the 3D occupancy map for resected piece of tissue 404, summing the volume of all the occupied voxels (i.e., voxels 802, 902, 1002, and 1004 in FIG. 10) yields a good estimation of the volume of resected piece of tissue 404. While only two dimensions are shown in these examples for clarity of illustration, it will be understood that voxels are 3D components that are used to construct a voxelized 3D representation that is analogous to the pixelized 2D representation shown in the figures herein. Additionally, while the raytracing technique is illustrated only from a single point 704, it will be understood that the estimation may be made more accurate by accounting for raytracing results from multiple vantage points (e.g., points analogous to point 704 that are associated with each of the orientations illustrated in snapshots 400). The estimation may also be made most accurate by using high-resolution raytracing operations, high-resolution depth data, and so forth.

As mentioned above, the volume detection technique that has been described in detail up to this point (i.e., the occupancy map volume detection technique that is performed, for example, by accessing of the plurality of depth datasets, generating of the 3D occupancy map, and determining the volume of the resected piece of tissue) may, in various examples, be supplemented or replaced by other suitable volume detection techniques that accomplish the same goal. Specifically, in certain embodiments, system 100 may be configured to implement, in addition to implementing the occupancy map volume detection technique, an additional volume detection technique that is configured to supplement the occupancy map volume detection technique by verifying an accuracy of the occupancy map volume detection technique, by refining the estimated volume determined using the occupancy map volume detection technique, by determining a volume for the resected piece of tissue that is to be verified or refined by the occupancy map volume detection technique, or by otherwise supplementing and/or improving operations performed using the occupancy map volume detection technique.

In other embodiments, system 100 may be configured to replace the occupancy map volume detection technique with one of the additional volume detection techniques as the primary volume detection technique. In certain of these examples, this primary volume detection technique may itself be supplemented by the occupancy map volume detection technique or any other volume detection technique described herein.

System 100 may perform any volume detection technique as may serve a particular implementation. For example, as mentioned above, suitable volume detection techniques may include not only the occupancy map volume detection technique described in detail above, but also volume detection techniques such as the interaction-based volume detection technique, the shrink-wrap-based volume detection technique, the force-sensing-based volume detection technique, the cavity-based volume detection technique, and/or any combination thereof. Each of the additional volume detection techniques (i.e., the interaction-based volume detection technique, the shrink-wrap-based volume detection technique, the force-sensing-based volume detection technique, and the cavity-based volume detection technique) will now be described in more detail in relation to FIGS. 11-14.

System 100 may perform an interaction-based volume detection technique by interacting with (e.g., prompting and/or receiving user input from) a surgical team member (e.g., the surgeon) to get assistance with determining an estimated volume of a resected piece of tissue. For example, system 100 may be configured to receive user input representative of a parameter of a geometric shape having a volume defined as a function of the parameter. As the user input is provided, system 100 may provide to the surgical team member a representation of the geometric shape in relation to the resected piece of tissue. For instance, the representation may be configured to facilitate the surgical team member in selecting the parameter so as to make the volume of the geometric shape approximate the volume of the resected piece of tissue. Accordingly, based on the volume of the geometric shape for the parameter represented by the received user input, system 100 may determine an estimated volume of the resected piece of tissue (or, if the interaction-based volume detection technique is being used as a supplemental volume detection technique, system 100 may determine an additional estimated volume of the resected piece of tissue that may be used to supplement a previously-estimated primary estimation of the volume by verifying or refining the primary estimation).

Figure 11:
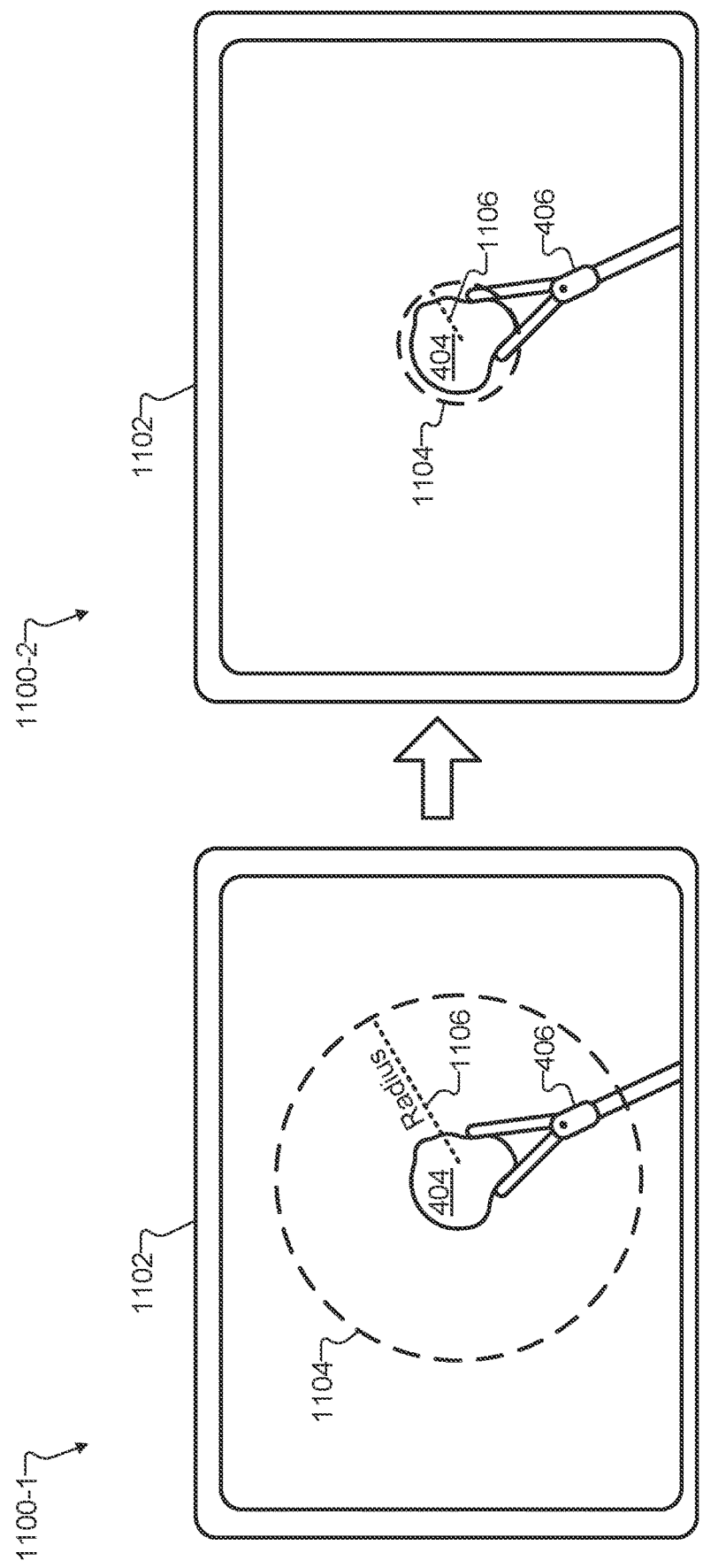
FIGS. 11-14 illustrate exemplary aspects of various additional volume detection techniques that may be used to verify the accuracy and/or refine the results of volume detection techniques described in relation to FIGS. 1-10 according to principles described herein.

To illustrate, FIG. 11 shows two views 1100 (i.e., views 1100-1 and 1100-2) of a display screen 1102 presented to a surgical team member. Display screen 1102 may represent a stereoscopic viewer built into user control system 204 for use by surgeon 210-1, display monitor 214 built into auxiliary system 206 for use by surgical team members 210-2 through 210-4, or another suitable display presented by any implementation of presentation system 306.

As shown in view 1100-1, a geometric shape 1104 associated with a parameter 1106 is represented on display screen 1102 in relation to resected piece of tissue 404 and the surgical instrument 406 that is holding resected piece of tissue 404. In this example, geometric shape 1104 represents a sphere and parameter 1106 is shown to be a radius of the sphere. In other examples, however, it will be understood that geometric shape may be any suitable 3D geometric shape for which a volume can be easily calculated as a function of parameter 1106. For example, just as the volume of the sphere represented by geometric shape 1104 may be defined as a function of radius parameter 406 by the well-known formula for the volume of a sphere (i.e., by cubing parameter 406 and multiplying it by $4\pi/3$), the volumes of other geometric shapes such as cubes, rectangular prisms, cylinders, pyramids, and so forth, may be similarly defined as functions of one or two basic parameters such as radii, lengths, widths, or so forth.

By viewing the representation of geometric shape 1104 in relation to resected piece of tissue 404 shown on display screen 1102, the surgical team member may provide input to adjust parameter 1106 to cause the volume of geometric shape 1104 to approximate the volume of resected piece of tissue 404. For example, as shown in view 1100-2, the surgical team member may provide input that shortens radius parameter 1106 until the volume of the sphere of geometric shape 1104 closely approximates the volume of resected piece of tissue 1104 (which, in this example, is itself similar in shape to a sphere). Once the surgical team member is satisfied that geometric shape 1104 approximates the size and shape of resected piece of tissue 404, system 100 may determine and provide the volume of geometric shape 1104, which may act as a proxy for the volume of resected piece of tissue 404.

The interaction-based volume detection technique illustrated in FIG. 11 may be customized in various ways to be effective, accurate, and easy to use for the surgical team member. For instance, in certain implementations, system 100 may provide a selection of different types of geometric shapes (including the sphere shown with geometric shape 1104) that the user may select from to best match the shape of a particular resected piece of tissue that is to be measured. If the resected piece of tissue more closely resembles a cylinder than a sphere, for example, system 100 may accept input from the surgical team member that selects a cylindrical geometric shape whose volume is defined by radius and length parameters that the surgical team member can select to make the cylinder approximate the resected piece of tissue in volume. In other implementations, system 100 may automatically select from the different types of available geometric shapes to attempt to approximate the shape of the resected piece of tissue, or system 100 may allow the user to draw or otherwise create his or her own desired geometric shape.

Just as instrument 406 is used to rotate and present resected piece of tissue 404 in front of the imaging device in the occupancy map volume detection technique described above, instrument 406 may similarly be used to rotate resected piece of tissue 404 to be viewed from multiple angles as the surgical team member adjusts parameter 1106 to properly size geometric shape 1104. In this way, geometric shape may be quickly and conveniently sized and modified to be a good proxy for resected piece of tissue 404 (i.e., a proxy whose volume may be readily calculated as a function of parameter 1106 based on standard equations for the volume of the geometric shape). As described above, system 100 may be configured to account for the volume of portions of instrument 406 that are in contact with resected piece of tissue 404 in any suitable way. For example, system 100 may automatically subtract a predetermined volume of the tips of the grasping elements of instrument 406 (i.e., the part of instrument 406 that is in direct contact with resected piece of tissue 404 and included within geometric shape 1104) from the volume estimated for resected piece of tissue 404 based on the volume of geometric shape 1104.

In some examples, rather than receiving user input from the surgical team member to adjust parameter 1106, system 100 may be configured to automatically adjust parameter 1106 using artificial intelligence (e.g., machine learning, etc.) or another suitable technology. In such cases, it may be practical for system 100 (in ways that would not be practical for a human user) to adjust more parameters to incorporate more nuance into the final geometric shape whose volume is calculated. For example, the shrink-wrap-based volume detection technique is configured to operate in this way.

In the shrink-wrap-based volume detection technique, system 100 may divide a geometric shape into a plurality of individually-sizable sectors where each individually-sizable sector has a volume defined as a function of a parameter associated with the individually-sizable sector, and where a volume of the geometric shape is defined as a sum of the volumes of all of the individually-sizable sectors. Rather than petitioning user input for each of these individual parameters (which may not be practical or convenient for a user to manually provide), system 100 may automatically set the respective parameters defining the volumes of each of the plurality of individually-sizable sectors in such a way as to make the individually-sizable sectors conform to corresponding parts of the surface of the resected piece of tissue. System 100 may then determine the volume of the geometric shape by summing the volumes of all of the plurality of individually-sizable sectors after the respective parameters have been set, and, based on this volume of the geometric shape, system 100 may determine an estimated volume of the resected piece of tissue (or, if the shrink-wrap-based volume detection technique is being used as a supplemental volume detection technique, system 100 may determine an additional estimated volume of the resected piece of tissue that may be used to supplement a previously-determined primary estimation of the volume by verifying or refining the primary estimation).

Figure 12:
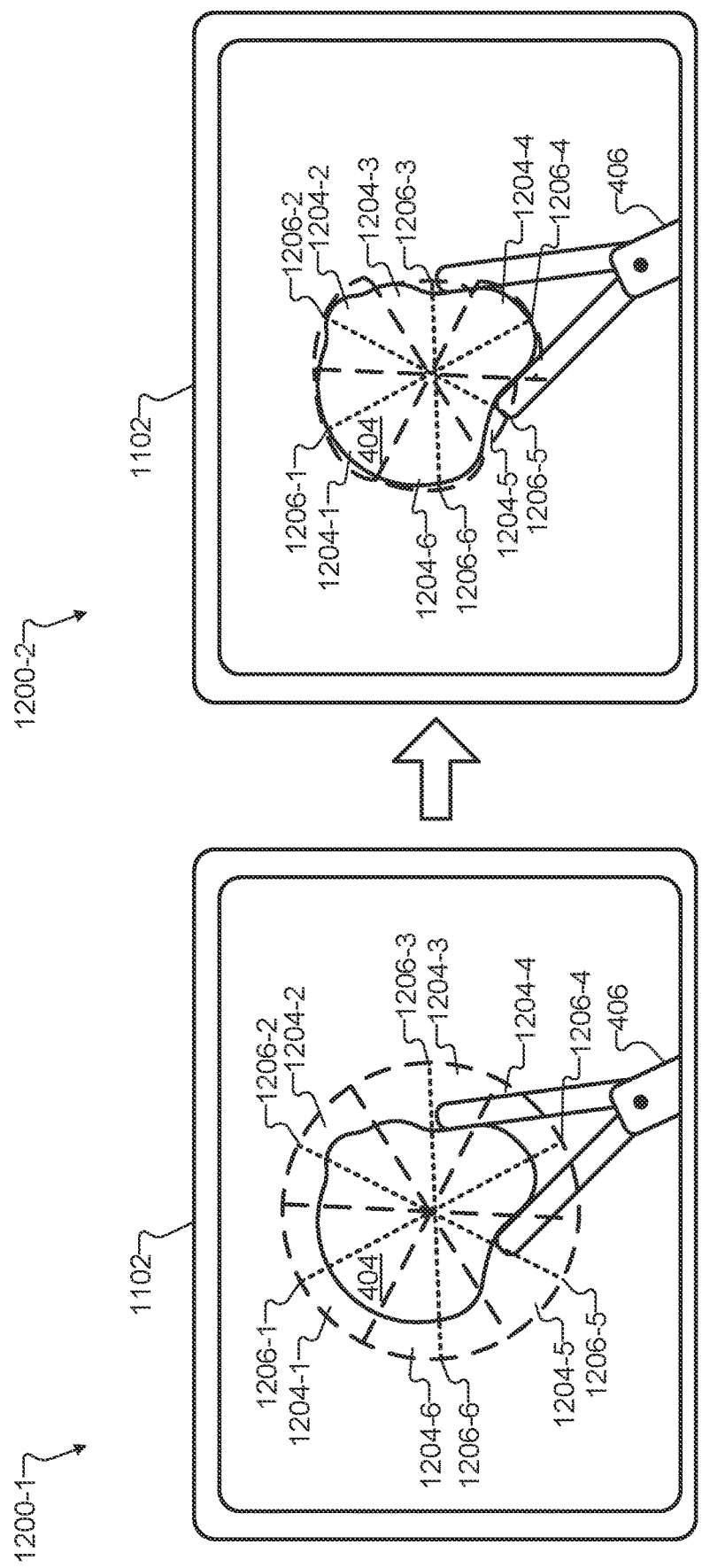

To illustrate, FIG. 12 shows two views 1200 (i.e., views 1200-1 and 1200-2) of display screen 1102, described above in relation to FIG. 11. As shown in view 1200-1, a spherical geometric shape similar to geometric shape 1104 is shown to be divided into a plurality of individually-sizable sectors 1204 (i.e., sectors 1204-1 through 1204-6), each of which is associated with a respective parameter 1206 (i.e., parameters 1206-1 through 1206-6, respectively). Just as the volume of the sphere of geometric shape 1104 could be readily computed as a function of parameter 1106, the respective volume of each sector 1204 in FIG. 12 may be readily computed as a function of its respective parameter 1206. The sum of the volumes of all of the sectors may then be readily computed to determine the volume of the entire geometric shape. Accordingly, in this volume detection technique, system 100 may be configured to automatically adjust each respective parameter 1206 to make the individually-sizable sector 1204 conform as closely as possible to the surface of resected piece of tissue 404 in an analogous way to how certain plastics may conform to an underlying shape when heat is applied during a shrink-wrapping process. View 1200-2 illustrates each of sectors 1204 after system 100 has adjusted each individual parameter 1206 to cause sectors 1204 to conform to the surface of resected piece of tissue 404.

System 100 may determine the appropriate parameters 1206 for each sector 1204 in the shrink-wrap-based volume detection technique in any suitable manner and/or using any suitable technologies or techniques. For example, system 100 may be configured to determine a point cloud of depth data for resected piece of tissue 404 and may use a signed distance function ("SDF") to determine how close each point in the point cloud is to the surface of the particular sector 1204 of the geometric shape around resected piece of tissue 404.

In the force-sensing-based volume detection technique, system 100 may be configured to determine a force value that is applied to a surgical instrument to allow the instrument to hold a resected piece of tissue in place. Based on this force value, system 100 may determine a mass of the resected piece of tissue (e.g., based on force calibration parameters since a more massive resected piece of tissue requires a larger force value to hold in place than a less massive resected piece of tissue). Based on the mass of the resected piece of tissue, system 100 may determine the estimated volume of the resected piece of tissue. For instance, system 100 may access an estimated density value for the resected piece of tissue, and, based on the force value and the estimated density value, system 100 may determine an estimated volume of the resected piece of tissue (or, if the force-sensing-based volume detection technique is being used as a supplemental volume detection technique, system 100 may determine an additional estimated volume of the resected piece of tissue that may be used to supplement a previously-determined primary estimation of the volume by verifying or refining the primary estimation).

Figure 13:
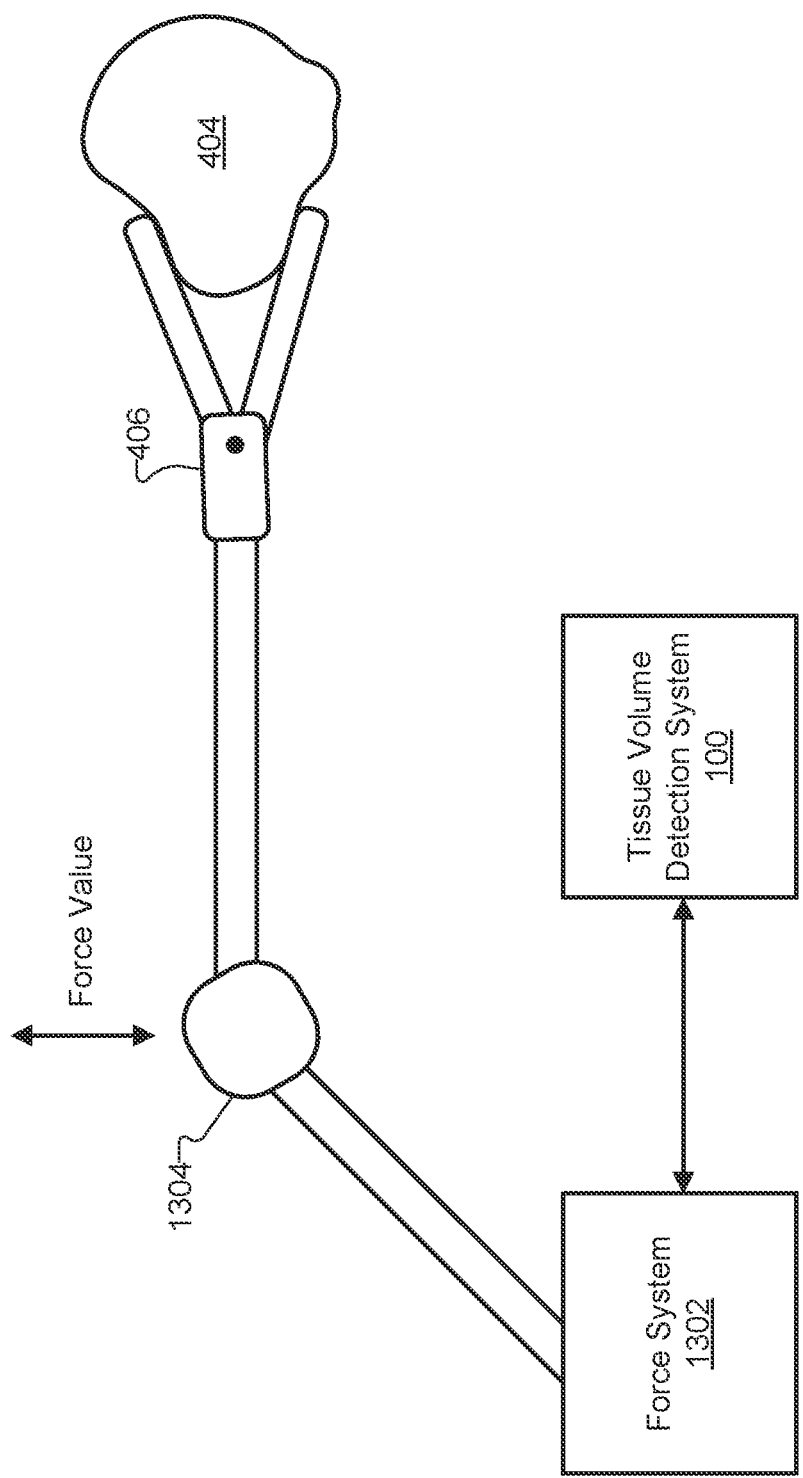

To illustrate, FIG. 13 shows exemplary aspects of a force-sensing-based volume detection technique including a force system 1302 that applies force to a joint 1304 associated with instrument 406 that is holding resected piece of tissue 404 in place. As shown, force system 1302 is included within or communicatively coupled with (e.g., and controlled by) system 100. In FIG. 13, force system 1302 uses kinematic data determined and provided in the ways described above to direct one or more joints such as joint 1304 of a manipulator arm (e.g., one of manipulator arms 212) to move and control instrument 406 in whatever manner surgical team members 210 may choose. When instrument 406 holds an object such as resected piece of tissue 404, however, force system 1302 may have to direct a greater force value to be applied by joint 1304 than if instrument 406 were not holding such as object.

For example, force system 1302 may report that a first amount of torque is required to move or hold up instrument 406 when nothing is being held by instrument 406, and that a second amount of torque is required to move or hold up instrument 406 when resected piece of tissue 404 is being held by instrument 406. Accordingly, system 100 may subtract the first force value from the second force value to determine how much torque is required to move or hold up resected piece of tissue 404, which may directly indicate the weight and/or mass of resected piece of tissue 404.

Once system 404 has determined the mass of resected piece of tissue 404, the estimated volume may be determined based on the mass and based on the density of resected piece of tissue 404, which may be stored and retrieved or otherwise accessed by system 100. For example, the volume of resected piece of tissue 404 may be readily calculated as the mass of resected piece of tissue divided by the density of resected piece of tissue 404.

To access the estimated density value for resected piece of tissue 404, system 100 may store a chart of various densities of different types of tissue and may access the estimated density value based on the type of surgery being performed, based on user input received from a surgical member, or based on any other suitable way that system 100 may have of detecting the type of tissue included in resected piece of tissue 404. In other examples, system 100 may employ a predetermined average density value or a density value provided by a surgical team member or the like.

In the cavity-based volume detection technique, system 100 may be configured to access, instead of or in addition to depth data for a resected piece of tissue itself, a plurality of depth datasets for a cavity left by the resected piece of tissue. Based on these depth datasets, system 100 may generate a 3D occupancy map analogous to the 3D occupancy maps described above, except that, instead of including voxels identified to be occupied by the resected piece of tissue itself, this 3D occupancy map includes a set of voxels identified to be occupied by the cavity left by the resected piece of tissue. System 100 may determine, based on the 3D occupancy map associated with the cavity, an estimated volume of the cavity left by the resected piece of tissue, and, based on the estimated volume of the cavity, system 100 may determine an estimated volume of the resected piece of tissue (or, if the cavity-based volume detection technique is being used as a supplemental volume detection technique, system 100 may determine an additional estimated volume of the resected piece of tissue that may be used to supplement a previously-determined primary estimation of the volume by verifying or refining the primary estimation).

Figure 14:
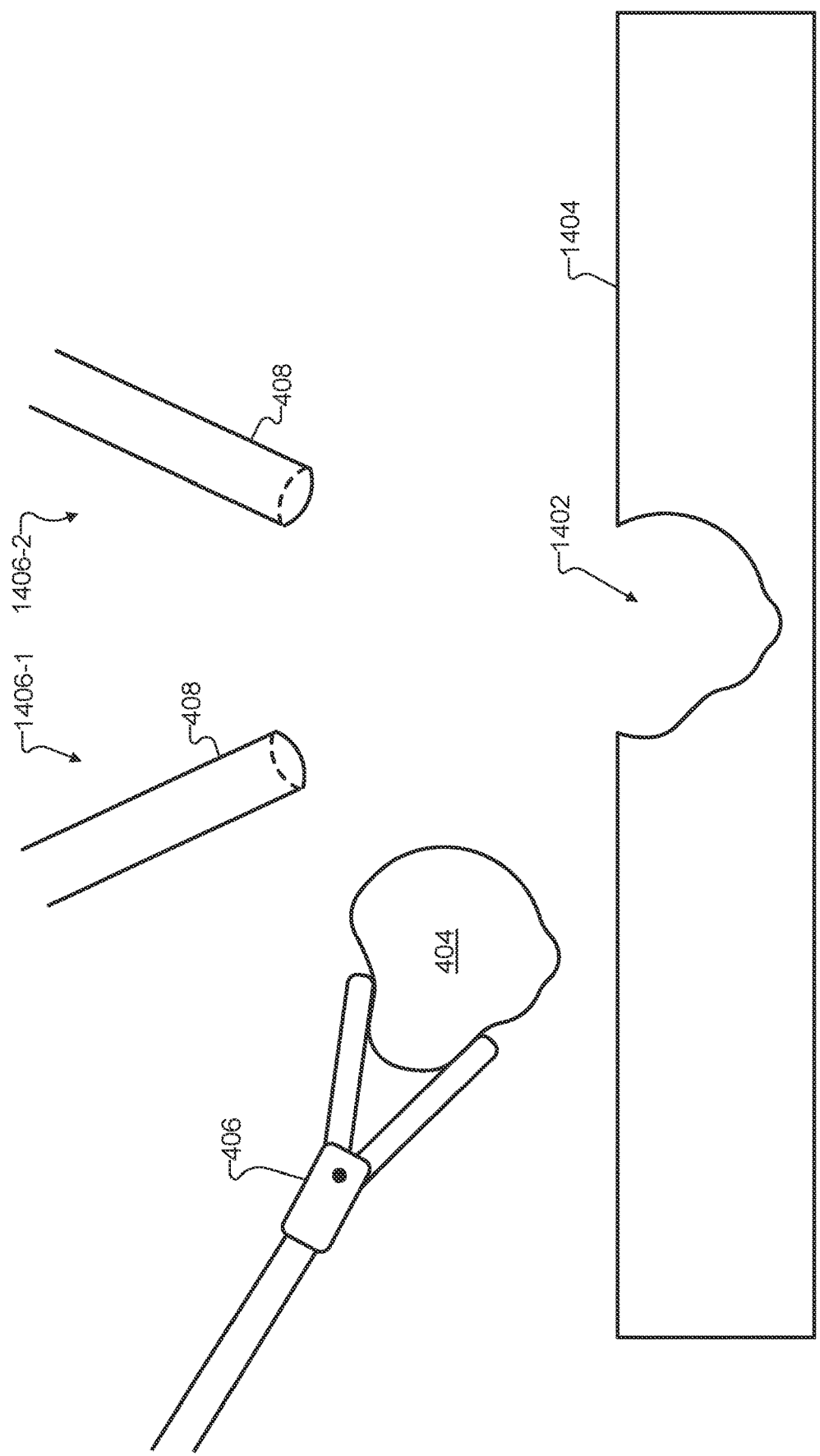

To illustrate, FIG. 14 shows a cavity 1402 left within tissue 1404 by resected piece of tissue 404. Using an analogous technique as described above for generating the 3D occupancy map of resected piece of tissue 404, system 100 may generate a 3D occupancy map for cavity 1402. The volume of cavity 1402 may be determined based on this 3D occupancy map and may serve as a proxy for the volume of resected piece of tissue 404 itself. While all sides of cavity 1402 may not be presented by instrument 406 to imaging device 408 in the same way as described above (e.g., see FIG. 4 above and the description associated therewith), cavity 1402 may still be viewed from multiple angles such as by moving imaging device 408 to different positions to capture different vantage points of cavity 1402. To illustrate, FIG. 14 shows two exemplary positions 1406 (i.e., positions 1406-1 and 1406-2) that imaging device 408 may employ to capture depth datasets for cavity 1402. While only two positions 1406 are explicitly illustrated in FIG. 14, it will be understood that various other positions 1406 may be employed in order to capture plenty of depth data for system 100 to generate the 3D occupancy map of cavity 1402.

Figure 15:
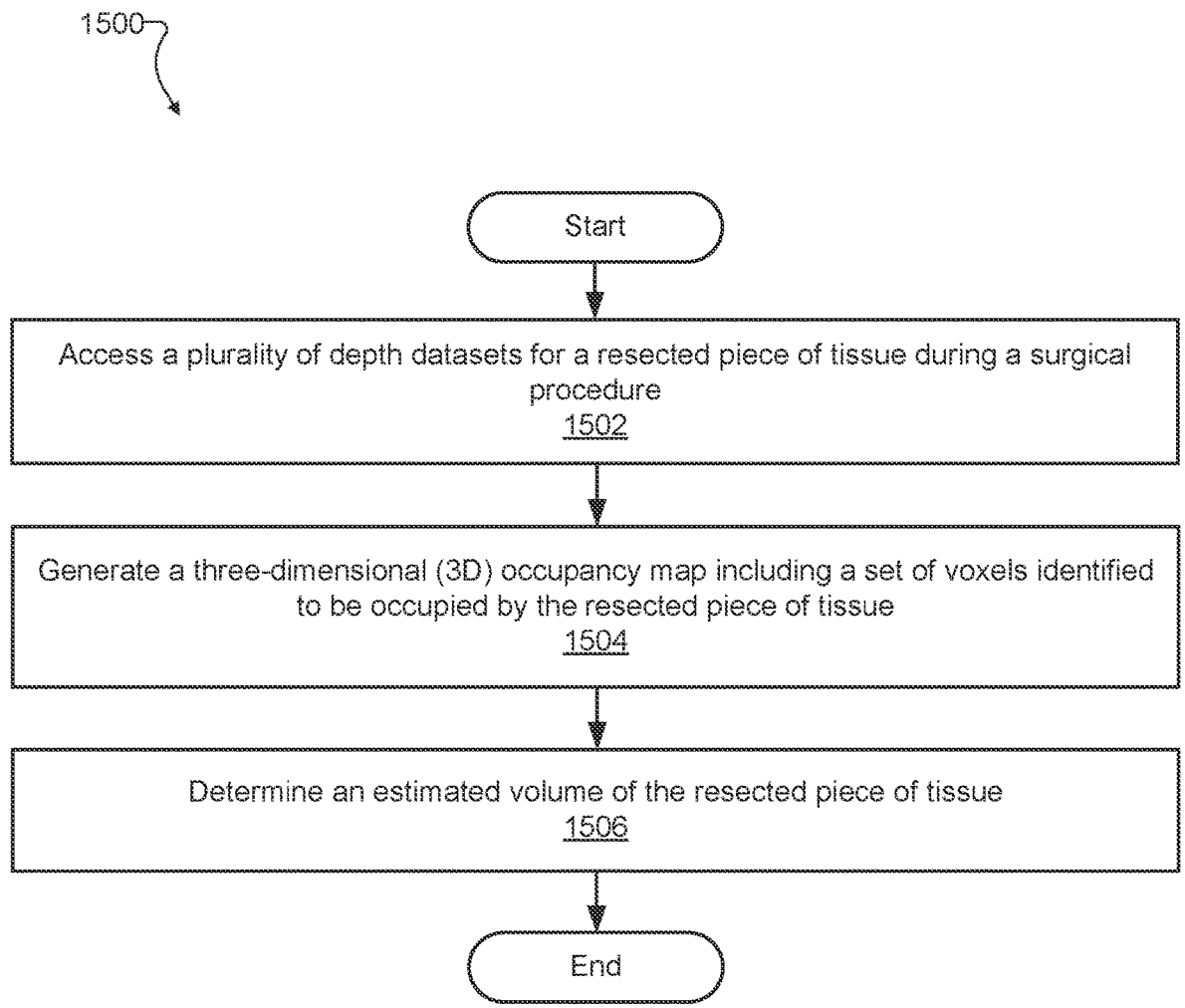
FIG. 15 illustrates an exemplary method for determining a volume of resected tissue during a surgical procedure according to principles described herein.

FIG. 15 illustrates an exemplary method 1500 for determining a volume of resected tissue during a surgical procedure. While FIG. 15 illustrates exemplary operations according to one embodiment, other embodiments may omit, add to, reorder, combine, and/or modify any of the operations shown in FIG. 15. One or more of the operations shown in in FIG. 15 may be performed by a tissue volume detection system during a surgical procedure that involves resecting a piece of tissue from a body. For example, the tissue volume detection system performing the operations shown in FIG. 15 may be system 100, any components included therein, and/or any implementation thereof.

In operation 1502, a tissue volume detection system may access a plurality of depth datasets for a resected piece of tissue. For example, operation 1502 may be performed during a surgical procedure that involves resecting a piece of tissue from a body, and the tissue volume detection system may access depth datasets associated with that resected piece of tissue. In some examples, each depth dataset in the plurality of depth datasets may be captured as a different portion of a surface of the resected piece of tissue is presented to an imaging device by an instrument that holds the resected piece of tissue in a manner that sequentially presents the different portions of the surface to the imaging device. Operation 1502 may be performed in any of the ways described herein.

In operation 1504, the tissue volume detection system may generate a 3D occupancy map that includes a set of voxels identified to be occupied by the resected piece of tissue. For example, the tissue volume detection system may generate the 3D occupancy map during the surgical procedure and based on the plurality of depth datasets accessed at operation 1502. Operation 1504 may be performed in any of the ways described herein.

In operation 1506, the tissue volume detection system may determine an estimated volume of the resected piece of tissue. For instance, the estimated volume of the resected piece of tissue may be determined by the tissue volume detection system during the surgical procedure based on the 3D occupancy map generated at operation 1504. Operation 1506 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

FIG. 16 illustrates an exemplary computing device 1600 that may be specifically configured to perform one or more of the processes described herein. Any of the systems, units, computing devices, and/or other components described herein may be implemented by computing device 1600.

As shown in FIG. 16, computing device 1600 may include a communication interface 1602, a processor 1604, a storage device 1606, and an input/output ("I/O") module 1608 communicatively connected one to another via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data and/or interpreting, executing, and/or directing execution of one or more of the instructions, processes, and/or operations described herein. Processor 1604 may perform operations by executing computer-executable instructions 1612 (e.g., an application, software, code, and/or other executable data instance) stored in storage device 1606.

Storage device 1606 may include one or more data storage media, devices, or configurations and may employ any type, form, and combination of data storage media and/or device. For example, storage device 1606 may include, but is not limited to, any combination of the non-volatile media and/or volatile media described herein. Electronic data, including data described herein, may be temporarily and/or permanently stored in storage device 1606. For example, data representative of computer-executable instructions 1612 configured to direct processor 1604 to perform any of the operations described herein may be stored within storage device 1606. In some examples, data may be arranged in one or more databases residing within storage device 1606.

I/O module 1608 may include one or more I/O modules configured to receive user input and provide user output. I/O module 1608 may include any hardware, firmware, software, or combination thereof supportive of input and output capabilities. For example, I/O module 1608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct an implementation of processor 1604 to perform one or more operations or functions associated with processing facility 104 of system 100. Likewise, storage facility 102 of system 100 may be implemented by or within an implementation of storage device 1606.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions; and
a processor communicatively coupled to the memory and configured to execute the instructions to:
access, during a surgical procedure that involves resecting a piece of tissue from a body, a plurality of depth datasets for the resected piece of tissue, each depth dataset in the plurality of depth datasets captured as a different portion of a surface of the resected piece of tissue is presented to an imaging device by an instrument that holds the resected piece of tissue in a manner that sequentially presents the different portions of the surface to the imaging device;

determine, during the surgical procedure and based on the plurality of depth datasets, an estimated volume of the resected piece of tissue;

indicate, during the surgical procedure, whether the estimated volume of the resected piece of tissue is within a predetermined threshold of an expected volume of the resected piece of tissue; and provide, during the surgical procedure and prior to the resected piece of tissue being removed from the body, the estimated volume of the resected piece of tissue for presentation to a member of a surgical team performing the surgical procedure.

2. The system of claim 1, wherein each depth dataset in the plurality of depth datasets includes, for a respective portion of the surface of the resected piece of tissue:

depth data representative of the respective portion of the surface;

metadata representative of a pose of the imaging device as the respective portion of the surface is presented to the imaging device by the instrument; and metadata representative of a pose of the instrument as the respective portion of the surface is presented to the imaging device by the instrument.

3. The system of claim 1, wherein:

the processor is further configured to execute the instructions to generate a three-dimensional (3D) occupancy map that includes a set of voxels identified to be occupied by the resected piece of tissue;

the generating of the 3D occupancy map includes:

performing a raytracing operation involving a set of virtual rays simulated to extend from a point associated with the imaging device to various points of intersection in the body, the raytracing operation including determining that one or more virtual rays of the set of virtual rays intersect with one or more points on the surface of the resected piece of tissue and that one or more other virtual rays of the set of virtual rays are determined not to intersect with the surface of the resected piece of tissue; and based on the raytracing operation, allocating, within a voxel data structure stored by the system to implement the 3D occupancy map, a respective occupied voxel for each of the one or more points on the surface of the resected piece of tissue with which a virtual ray is determined to intersect as part of the raytracing operation; and the determining of the estimated volume of the resected piece of tissue is performed based on the 3D occupancy map.

4. The system of claim 3, wherein:

at least one of the virtual rays determined to intersect with a first point of the one or more points on the surface is further determined to intersect, after passing through the resected piece of tissue, with a second point of the one or more points on the surface of the resected piece of tissue; and the generating of the 3D occupancy map further includes allocating, within the voxel data structure, an additional occupied voxel associated with an internal point disposed within the resected piece of tissue between the first and second points on the surface of the resected piece of tissue.

5. The system of claim 3, wherein the generating of the 3D occupancy map further includes allocating, within the voxel data structure, an additional occupied voxel associated with a point on the surface of the resected piece of tissue that:

is not determined by the raytracing operation to intersect with a virtual ray of the set of virtual rays, and is disposed between two points on the surface of the resected piece of tissue that are determined by the raytracing operation to intersect with virtual rays of the set of virtual rays.

6. The system of claim 1, wherein the processor is further configured to execute the instructions to implement, in addition to implementing a first volume detection technique that includes the accessing of the plurality of depth datasets and the determining of the estimated volume of the resected piece of tissue, a second volume detection technique that is configured to perform at least one of:

verifying an accuracy of the first volume detection technique; or refining the estimated volume determined using the first volume detection technique.

7. The system of claim 6, wherein the second volume detection technique includes:

receiving user input from a member of a surgical team performing the surgical procedure, the user input representative of a parameter of a geometric shape having a volume defined as a function of the parameter;

providing, to the member of the surgical team as the user input is provided, a representation of the geometric shape in relation to the resected piece of tissue, the representation configured to facilitate the member of the surgical team in selecting the parameter so as to make the volume of the geometric shape approximate the volume of the resected piece of tissue; and determining, based on the volume of the geometric shape for the parameter represented by the received user input, an additional estimated volume of the resected piece of tissue.

8. The system of claim 6, wherein the second volume detection technique includes:

accessing an additional plurality of depth datasets for a cavity left by the resected piece of tissue;

determining, based on the additional plurality of depth datasets, an estimated volume of the cavity left by the resected piece of tissue; and determining, based on the estimated volume of the cavity, an additional estimated volume of the resected piece of tissue.

9. The system of claim 6, wherein the second volume detection technique includes:

determining a force value that is applied to the instrument to allow the instrument to hold the resected piece of tissue in place;

determining, based on the force value, a mass of the resected piece of tissue;

accessing an estimated density value for the resected piece of tissue; and determining, based on the force value and the estimated density value, an additional estimated volume of the resected piece of tissue.

10. The system of claim 6, wherein the second volume detection technique includes:

dividing a geometric shape into a plurality of individually-sizable sectors, each individually-sizable sector having a volume defined as a function of a parameter associated with the individually-sizable sector, and a volume of the geometric shape defined as a sum of the volumes of all of the individually-sizable sectors;

setting the respective parameters defining the volumes of each of the plurality of individually-sizable sectors in such a way as to make the individually-sizable sectors conform to corresponding parts of the surface of the resected piece of tissue;

determining the volume of the geometric shape by summing the volumes of all of the plurality of individually-sizable sectors after the respective parameters have been set; and determining, based on the volume of the geometric shape, an additional estimated volume of the resected piece of tissue.

11. The system of claim 1, wherein the plurality of depth datasets accessed for the resected piece of tissue collectively include depth data representative of an entirety of the surface of the resected piece of tissue.

12. The system of claim 1, wherein:

the imaging device is implemented as a stereoscopic imaging device that includes stereoscopic imaging elements; and the accessing of the plurality of depth datasets includes generating each of the plurality of depth datasets by determining depth data for the respective portion of the surface of the resected piece of tissue using a stereoscopic depth detection technique that employs the stereoscopic imaging elements of the stereoscopic imaging device.

13. A system comprising:

a memory storing instructions; and a processor communicatively coupled to the memory and configured to execute the instructions to:

access, during a surgical procedure that involves resecting a piece of tissue from a body, a plurality of depth datasets for the resected piece of tissue, each depth dataset in the plurality of depth datasets captured as a different portion of a surface of the resected piece of tissue is presented to an imaging device by an instrument that holds the resected piece of tissue in a manner that sequentially presents the different portions of the surface to the imaging device;

access an expected volume of the resected piece of tissue, the expected volume determined prior to the surgical procedure;

determine, during the surgical procedure and based on the plurality of depth datasets, an estimated volume of the resected piece of tissue;

compare, during the surgical procedure, the estimated volume of the resected piece of tissue with the expected volume of the resected piece of tissue;

indicate, during the surgical procedure to a member of a surgical team performing the surgical procedure, whether the estimated volume is within a predetermined threshold of the expected volume; and provide, during the surgical procedure and prior to the resected piece of tissue being removed from the body, the estimated volume of the resected piece of tissue for presentation to the member of the surgical team.

14. The system of claim 13, wherein each depth dataset in the plurality of depth datasets includes, for a respective portion of the surface of the resected piece of tissue:

depth data representative of the respective portion of the surface;

metadata representative of a pose of the imaging device as the respective portion of the surface is presented to the imaging device by the instrument; and metadata representative of a pose of the instrument as the respective portion of the surface is presented to the imaging device by the instrument.

15. The system of claim 13, wherein:

the processor is further configured to execute the instructions to generate a three-dimensional (3D) occupancy map that includes a set of voxels identified to be occupied by the resected piece of tissue;

the generating of the 3D occupancy map includes:

performing a raytracing operation involving a set of virtual rays simulated to extend from a point associated with the imaging device to various points of intersection in the body, the raytracing operation including determining that one or more virtual rays of the set of virtual rays intersect with one or more points on the surface of the resected piece of tissue and that one or more other virtual rays of the set of virtual rays are determined not to intersect with the surface of the resected piece of tissue; and based on the raytracing operation, allocating, within a voxel data structure stored by the system to implement the 3D occupancy map, a respective occupied voxel for each of the one or more points on the surface of the resected piece of tissue with which a virtual ray is determined to intersect as part of the raytracing operation; and the determining of the estimated volume of the resected piece of tissue is performed based on the 3D occupancy map.

16. A method comprising:

accessing, by a tissue volume detection system during a surgical procedure that involves resecting a piece of tissue from a body, a plurality of depth datasets for the resected piece of tissue, each depth dataset in the plurality of depth datasets captured as a different portion of a surface of the resected piece of tissue is presented to an imaging device by an instrument that holds the resected piece of tissue in a manner that sequentially presents the different portions of the surface to the imaging device;

determining, by the tissue volume detection system during the surgical procedure and based on the plurality of depth datasets, an estimated volume of the resected piece of tissue;

indicating, by the tissue volume detection system during the surgical procedure, whether the estimated volume of the resected piece of tissue is within a predetermined threshold of an expected volume of the resected piece of tissue; and providing, by the tissue volume detection system during the surgical procedure and prior to the resected piece of tissue being removed from the body, the estimated volume of the resected piece of tissue for presentation to a member of a surgical team performing the surgical procedure.

17. The method of claim 16, wherein each depth dataset in the plurality of depth datasets includes, for a respective portion of the surface of the resected piece of tissue:

depth data representative of the respective portion of the surface;

metadata representative of a pose of the imaging device as the respective portion of the surface is presented to the imaging device by the instrument; and metadata representative of a pose of the instrument as the respective portion of the surface is presented to the imaging device by the instrument.

18. The method of claim 16, further comprising generating, by the tissue volume detection system during the surgical procedure, a three-dimensional (3D) occupancy map that includes a set of voxels identified to be occupied by the resected piece of tissue; wherein:

the generating of the 3D occupancy map includes:

performing a raytracing operation involving a set of virtual rays simulated to extend from a point associated with the imaging device to various points of intersection in the body, the raytracing operation including determining that one or more virtual rays of the set of virtual rays intersect with one or more points on the surface of the resected piece of tissue and that one or more other virtual rays of the set of virtual rays are determined not to intersect with the surface of the resected piece of tissue; and based on the raytracing operation, allocating, within a voxel data structure stored by the tissue volume detection system to implement the 3D occupancy map, a respective occupied voxel for each of the points on the surface of the resected piece of tissue with which a virtual ray is determined to intersect as part of the raytracing operation; and the determining of the estimated volume of the resected piece of tissue is performed based on the 3D occupancy map.

19. The method of claim 16, further comprising implementing, by the tissue volume detection system in addition to implementing a first volume detection technique that includes the accessing of the plurality of depth datasets and the determining of the estimated volume of the resected piece of tissue, a second volume detection technique that is configured to perform at least one of:

verifying an accuracy of the first volume detection technique; or refining the estimated volume determined using the first volume detection technique.

20. The method of claim 19, wherein the second volume detection technique includes:

receiving user input from a member of a surgical team performing the surgical procedure, the user input representative of a parameter of a geometric shape having a volume defined as a function of the parameter;

providing, to the member of the surgical team as the user input is provided, a representation of the geometric shape in relation to the resected piece of tissue, the representation configured to facilitate the member of the surgical team in selecting the parameter so as to make the volume of the geometric shape approximate the volume of the resected piece of tissue; and determining, based on the volume of the geometric shape for the parameter represented by the received user input, an additional estimated volume of the resected piece of tissue.

* * * * *